US012525243B2

(12) United States Patent
Lim et al.

(10) Patent No.: US 12,525,243 B2
(45) Date of Patent: Jan. 13, 2026

(54) ELECTRONIC DEVICE AND METHOD FOR PROVIDING OPERATING STATE OF PLURALITY OF DEVICES

(71) Applicant: SAMSUNG ELECTRONICS CO., LTD., Suwon-si (KR)

(72) Inventors: Changbeom Lim, Suwon-si (KR); Kyungtae Kim, Suwon-si (KR); Hoseon Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 203 days.

(21) Appl. No.: 18/370,222

(22) Filed: Sep. 19, 2023

(65) Prior Publication Data

US 2024/0096331 A1 Mar. 21, 2024

Related U.S. Application Data

(63) Continuation of application No. PCT/KR2023/014178, filed on Sep. 19, 2023.

(30) Foreign Application Priority Data

Sep. 19, 2022 (KR) .................. 10-2022-0118227
Oct. 21, 2022 (KR) .................. 10-2022-0136757

(51) Int. Cl.
*G10L 15/32* (2013.01)
*G10L 15/22* (2006.01)

(52) U.S. Cl.
CPC .............. *G10L 15/32* (2013.01); *G10L 15/22* (2013.01); *G10L 2015/223* (2013.01)

(58) Field of Classification Search
USPC ................... 704/246, 247, 251, 252, 275
See application file for complete search history.

(56) References Cited

U.S. PATENT DOCUMENTS 9,408,048 B1 * 8/2016 Paulrajan ............... H04W 4/60
10,650,822 B2   5/2020 Choi
(Continued)

FOREIGN PATENT DOCUMENTS

KR   10-2018-0027950 A   3/2018
KR   10-2019-0075870 A   7/2019
(Continued)

OTHER PUBLICATIONS

International Search Report (PCT/ISA/210) issued by the International Searching Authority on Jan. 8, 2024 in International Application No. PCT/KR2023/014178.

*Primary Examiner* — Leonard Saint-Cyr
(74) *Attorney, Agent, or Firm* — Sughrue Mion, PLLC

(57) ABSTRACT

Provided is an electronic device that may receive information corresponding to a user utterance from a first external electronic device, identify a second external electronic device to perform at least a part of an action corresponding to the user utterance, based on determining that the first external electronic device and the second external electronic device are not located within a specified range: determine a target external electronic device to provide a first notification and transmit a command to the target external electronic device to provide the first notification, and transmit a command to the second external electronic device to perform the part of the action corresponding to the user utterance.

20 Claims, 12 Drawing Sheets

(56) References Cited

U.S. PATENT DOCUMENTS

| | | | |
|---|---|---|---|
| 10,860,096 B2 | 12/2020 | Kelly et al. | |
| 11,082,815 B2* | 8/2021 | Park | H04W 4/80 |
| 11,189,268 B2 | 11/2021 | Park et al. | |
| 11,393,491 B2 | 7/2022 | Han et al. | |
| 11,443,744 B2 | 9/2022 | Kang et al. | |
| 11,482,227 B2 | 10/2022 | Choi | |
| 11,545,158 B2 | 1/2023 | Ko et al. | |
| 11,586,977 B2 | 2/2023 | Han et al. | |
| 11,619,991 B2 | 4/2023 | Kelly et al. | |
| 12,170,083 B1* | 12/2024 | Anderson | G10L 25/78 |
| 2008/0282182 A1 | 11/2008 | Oosaka | |
| 2017/0133011 A1* | 5/2017 | Chen | G10L 15/22 |
| 2017/0236510 A1* | 8/2017 | Fuchiwaki | G10L 15/30 |
| | | | 704/251 |
| 2018/0240331 A1* | 8/2018 | Lee | G08C 17/02 |
| 2020/0103963 A1 | 4/2020 | Kelly et al. | |
| 2020/0111025 A1 | 4/2020 | Han et al. | |
| 2020/0257496 A1* | 8/2020 | Lee | G10L 15/30 |
| 2020/0356221 A1* | 11/2020 | Behzadi | H04L 67/10 |
| 2021/0048883 A1 | 2/2021 | Kelly et al. | |
| 2021/0366506 A1 | 11/2021 | Han et al. | |
| 2022/0180870 A1 | 6/2022 | Kim et al. | |
| 2022/0230063 A1 | 7/2022 | Kwon et al. | |
| 2022/0279063 A1* | 9/2022 | Coffman | H04M 1/72442 |
| 2023/0177398 A1 | 6/2023 | Han et al. | |
| 2023/0185373 A1 | 6/2023 | Kelly et al. | |

FOREIGN PATENT DOCUMENTS

| | | |
|---|---|---|
| KR | 10-2019-0094307 A | 8/2019 |
| KR | 10-2019-0111624 A | 10/2019 |
| KR | 10-2020-0001192 A | 1/2020 |
| KR | 10-2020-0024068 A | 3/2020 |
| KR | 10-2020-0044173 A | 4/2020 |
| KR | 10-2022-0078866 A | 6/2022 |
| KR | 10-2022-0105036 A | 7/2022 |

* cited by examiner

ELECTRONIC DEVICE AND METHOD FOR PROVIDING OPERATING STATE OF PLURALITY OF DEVICES

CROSS-REFERENCE TO RELATED APPLICATION(S)

This application is a bypass continuation of PCT International Application No. PCT/KR2023/014178, which was filed on Sep. 19, 2023, and claims priority to Korean Patent Application No. 10-2022-0118227, filed on Sep. 19, 2022, and Korean Patent Application No. 10-2022-0136757, filed on Oct. 21, 2022, in the Korean Intellectual Property Office, the disclosures of which are incorporated herein by reference in their entireties.

BACKGROUND

1. Field

The disclosure is related to an electronic device and method for providing operating states of a plurality of devices, and more specifically, to an electronic device and method for providing an operating state of one or more electronic devices among the plurality of devices, in relation to a voice assistance service.

2. Description of Related Art

With the development of speech recognition technology, a speech recognition function may be implemented in various electronic devices including microphones. For example, a voice assistance service capable of providing an intuitive interface between electronic devices has been developed. The voice assistance service may infer a user's intent by performing natural language processing on the user's utterance, and may allow a device to be controlled based on the inferred intent of the user. In particular, there is an increasing need for a technology capable of transmitting and receiving information between a plurality of electronic devices through speech recognition and seamlessly performing operations corresponding to utterances.

SUMMARY

When a user remotely controls an electronic device in a common space, other electronic devices or other users in the common space may not know that the user is remotely controlling the electronic device. Alternatively, when there is an unregistered electronic device (e.g., an electronic device unregistered in a user account) in the common space in the case where a user (e.g., a first user) controls an electronic device (e.g., a first electronic device) in the common space, the unregistered electronic device or another user (e.g., a second user) of the unregistered electronic device may not know that the first user controls the first electronic device. Accordingly, commands for controlling electronic devices in the same space in which a user and another user are present may conflict with each other, or it may be inconvenient to control an electronic device in the common space. For example, in the voice assistance system, an electronic device (hereinafter, used interchangeably with a term of a 'listener' or 'receiving device') receiving the user's utterance and an electronic device (hereinafter, used interchangeably with a term of an 'executor' or 'execution device') performing at least part of an operation corresponding to the user's utterance may know that the user is controlling the execution device through the receiving device, but another device (or another user of the another device) other than the receiving device and the execution device may not know that the user is controlling the execution device.

One or more example embodiments of the disclosure provide an electronic device that provides information about operating states (or control states) of a plurality of devices in relation to a voice assistance service.

According to an aspect of an embodiment, an electronic device includes: a communication circuit; a memory storing at least one instruction; and at least one processor configured to execute the at least one instruction to: receive, through the communication circuit, information corresponding to a user utterance from a first external electronic device; identify a second external electronic device to perform at least a part of an action corresponding to the user utterance, based on the information corresponding to the user utterance; determine whether the first external electronic device and the second external electronic device are located within a specified range; based on determining that the first external electronic device and the second external electronic device are not located within the specified range, determine a target external electronic device to provide a first notification related to the part of the action corresponding to the user utterance, from among the second external electronic device and at least one third external electronic device located within the specified range from the second external electronic device; based on determining that the first external electronic device and the second external electronic device are not located within the specified range, transmit, through the communication circuit, a command to the target external electronic device to provide the first notification; and transmit, through the communication circuit, a command to the second external electronic device to perform the part of the action corresponding to the user utterance.

The at least one processor may be further configured to execute the at least one instruction to: receive at least a part of location information or network connection information of the first external electronic device, from the first external electronic device; receive at least a part of location information or network connection information of the second external electronic device, from the second external electronic device; and determine whether the first external electronic device and the second external electronic device are located within the specified range, based on the part of the location information or the network information of each of the first external electronic device and the second external electronic device.

The at least one processor may be further configured to execute the at least one instruction to: determine whether the at least one third external electronic device comprises an unregistered electronic device that is not registered in a same user account as the first external electronic device and the second external electronic device; and determine the target external electronic device from among the second external electronic device and the at least one third external electronic device other than the unregistered electronic device.

The at least one processor may be further configured to execute the at least one instruction to: receive information of the at least one third external electronic device from an access point device connected to the second external electronic device through a network, wherein the at least one third external electronic device is connected to the access point device over a network; and determine the unregistered electronic device based on pre-stored user account information and the information of the at least one third external electronic device.

The at least one processor may be further configured to execute the at least one instruction to: transmit, through the communication circuit, at least a part of information indicating that the first notification has been provided, or information indicating that the unregistered electronic device is in a same space as the second external electronic device to the first external electronic device.

The at least one processor may be further configured to execute the at least one instruction to: receive, through the communication circuit, information about a result of performing the part of the action corresponding to the user utterance from the second external electronic device; and transmit, through the communication circuit, the information about the result of performing the part of the action corresponding to the user utterance to the first external electronic device.

The first notification related to the part of the action corresponding to the user utterance comprises information indicating that the second external electronic device is determined to perform the part of the action corresponding to the user utterance based on the user utterance received from the first external electronic device.

The at least one processor may be further configured to execute the at least one instruction to: generate a natural language message corresponding to the first notification; determine the target external electronic device to provide the first notification such that the target external electronic device is capable of visually or audibly outputting the natural language message; and transmit, through the communication circuit, a command to the target external electronic device to output the natural language message.

The at least one processor may be further configured to execute the at least one instruction to: based on determining that the first external electronic device and the second external electronic device are located within the specified range, determine to not provide the first notification using the target electronic device.

The at least one processor may be further configured to execute the at least one instruction to: based on determining that the first external electronic device and the second external electronic device are located within the specified range, determine the target electronic device and transmit a command to the target external electronic device to provide a second notification different from the first notification.

According to an aspect of an embodiment, a method for providing operating states of a plurality of devices, the method includes: receiving information corresponding to a user utterance from a first external electronic device; identifying a second external electronic device to perform at least a part of an action corresponding to the user utterance, based on the information corresponding to the user utterance; determining whether the first external electronic device and the second external electronic device are located within a specified range; based on determining that the first external electronic device and the second external electronic device are not located within the specified range, determining a target external electronic device to provide a first notification related to the part of the action corresponding to the user utterance, from among the second external electronic device and at least one third external electronic device located within the specified range from the second external electronic device; based on determining that the first external electronic device and the second external electronic device are not located within the specified range, transmitting a command to the target external electronic device to provide the first notification; and transmitting a command to the second external electronic device to perform the part of the action corresponding to the user utterance.

The determining whether the first external electronic device and the second external electronic device are in the same space may include: receiving, from the first external electronic device, at least a part of location information or network connection information of the first external electronic device; receiving, from the second external electronic device, at least part of location information or network connection information of the second external electronic device; and determining whether the first external electronic device and the second external electronic device are located within the specified range, based on the part of the location information or the network information of each of the first external electronic device and the second external electronic device.

The determining the target external electronic device to provide the first notification may include: determining whether the at least one third external electronic device comprises an unregistered electronic device that is not registered in a same user account as the first external electronic device and the second external electronic device; and determining the target external electronic device from among the second external electronic device and the at least one third external electronic device other than the unregistered electronic device.

The determining whether the at least one third external electronic device comprises an unregistered electronic device may include: receiving information of the at least one third external electronic device from an access point device connected to the second external electronic device through a network, wherein the at least one third external device is connected to the access point device over a network; and identifying the unregistered electronic device based on pre-stored user account information and the information of the at least one third external electronic device.

The method may further include: transmitting, to the first external electronic device, at least a part of information indicating that the notification has been provided or information indicating that the unregistered electronic device is present in a same space as the second external electronic device.

The method may further include: receiving, from the second external electronic device, information about a result of performing the part of the action corresponding to the user utterance; and transmitting, to the first external electronic device, information about the result of performing the part of the action corresponding to the user utterance.

The first notification related to the part of the action corresponding to the user utterance comprises information indicating that the second external electronic device is determined to perform the part of the action corresponding to the user utterance based on the user utterance received from the first external electronic device.

The transmitting the command to the target external electronic device to provide the first notification may include: generating a natural language message corresponding to the first notification; determining the target external electronic device to provide the first notification such that the target external electronic device is capable of visually or audibly outputting the natural language message; and transmitting a command to the target external electronic device to output the natural language message.

The method may further include: based on determining that the first electronic device and the second electronic device are located within the specified range, determining to not provide the first notification using the target electronic device.

The method may further include: based on determining that the first electronic device and the second electronic device are located within the specified range, determining the target electronic device and transmitting a command to the target electronic device to provide a second notification different from the first notification.

According to an aspect of an embodiment, a non-transitory computer readable medium stores computer readable program code or instructions which are executable by a processor to perform a method for providing operating states of a plurality of devices. The method includes: receiving information corresponding to a user utterance from a first external electronic device; determining a second external electronic device to perform at least a part of an action corresponding to the user utterance, based on the information corresponding to the user utterance; determining whether the first external electronic device and the second external electronic device are located within a specified range; based on determining that the first external electronic device and the second external electronic device are not located within the specified range, determining a target external electronic device to provide a first notification related to the part of the action corresponding to the user utterance, from among the second external electronic device and at least one third external electronic device located within the specified range from the second external electronic device; based on determining that the first external electronic device and the second external electronic device are not located within the specified range, transmitting a command to the target external electronic device to provide the first notification; and transmitting a command to the second external electronic device to perform the part of the action corresponding to the user utterance.

Provided are an electronic device and method for providing an operating state of one or more electronic devices among a plurality of devices, in relation to a voice assistance service.

According to an embodiment, the electronic device and method may provide information about operating states or control states of a plurality of devices in relation to a voice assistance service.

According to an embodiment, the electronic device and method may notify a device unregistered in a user account that the user controls an electronic device by using another electronic device.

According to an embodiment, the electronic device and method may notify another electronic device or another user in a same space that a user remotely controls an electronic device in the same space.

While certain advantageous effects have been described, the disclosure is not limited thereto, and it is apparent that a variety of effects directly or indirectly understood through the disclosure may be provided, and various modifications can be made by those having ordinary skill in the technical field to which the disclosure belongs, without departing from the gist of the disclosure as claimed by the appended claims and their equivalents. Also, it is intended that such modifications are not to be interpreted independently from the technical idea or prospect of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Figure 1:
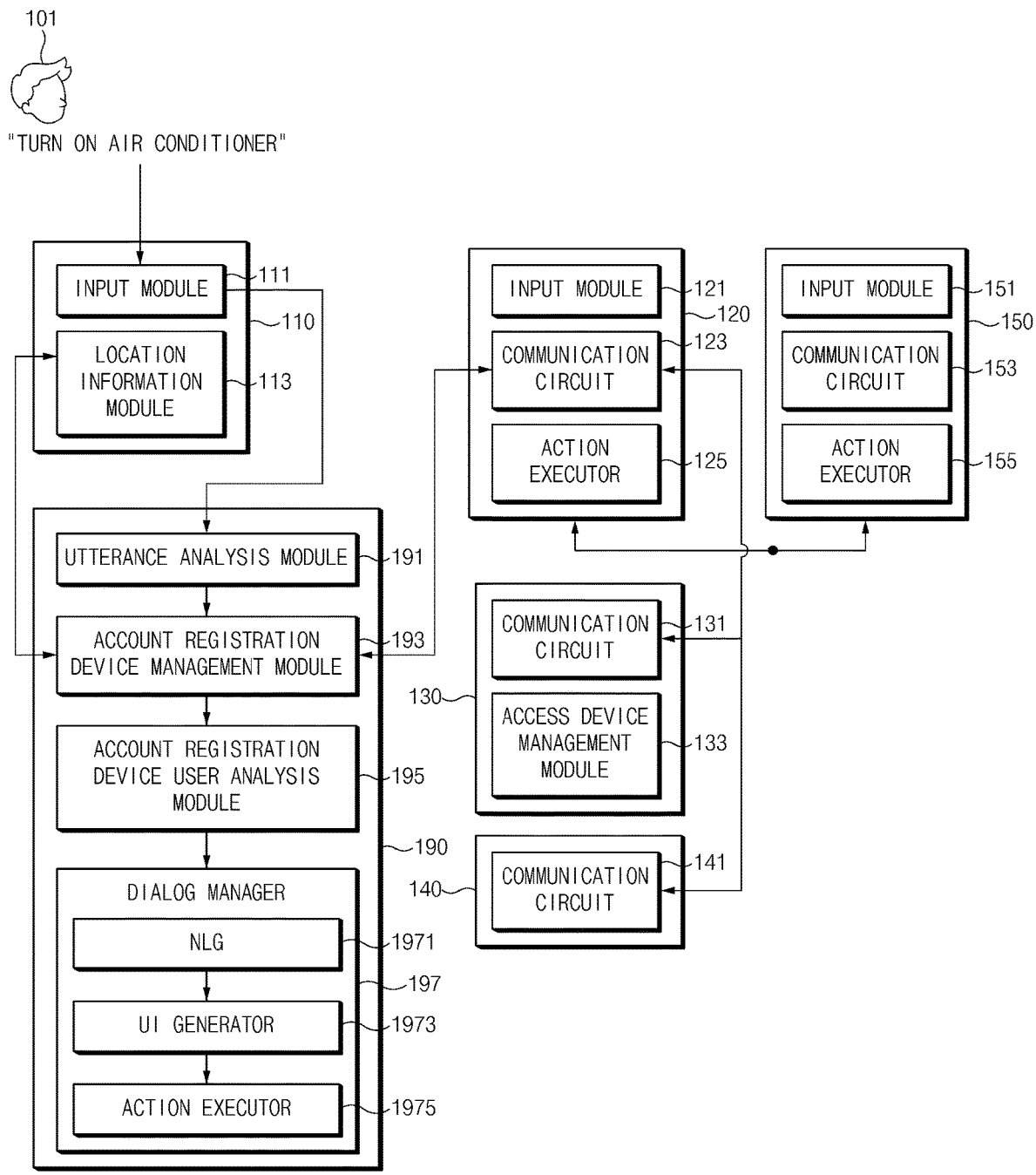
FIG. 1 is a block diagram of a voice assistance system, according to one or more embodiments.

With regard to description of drawings, the same or similar components may have the same or similar reference signs or numbers.

DETAILED DESCRIPTION

Hereinafter, embodiments of the present disclosure will be described in detail with reference to the accompanying drawings, where similar reference characters denote corresponding features consistently throughout.

FIG. 1 is a block diagram of a voice assistance system, according to one or more embodiments.

Figure 2:
FIG. 2 is a block diagram of an electronic device, according to one or more embodiments.
Figure 9:
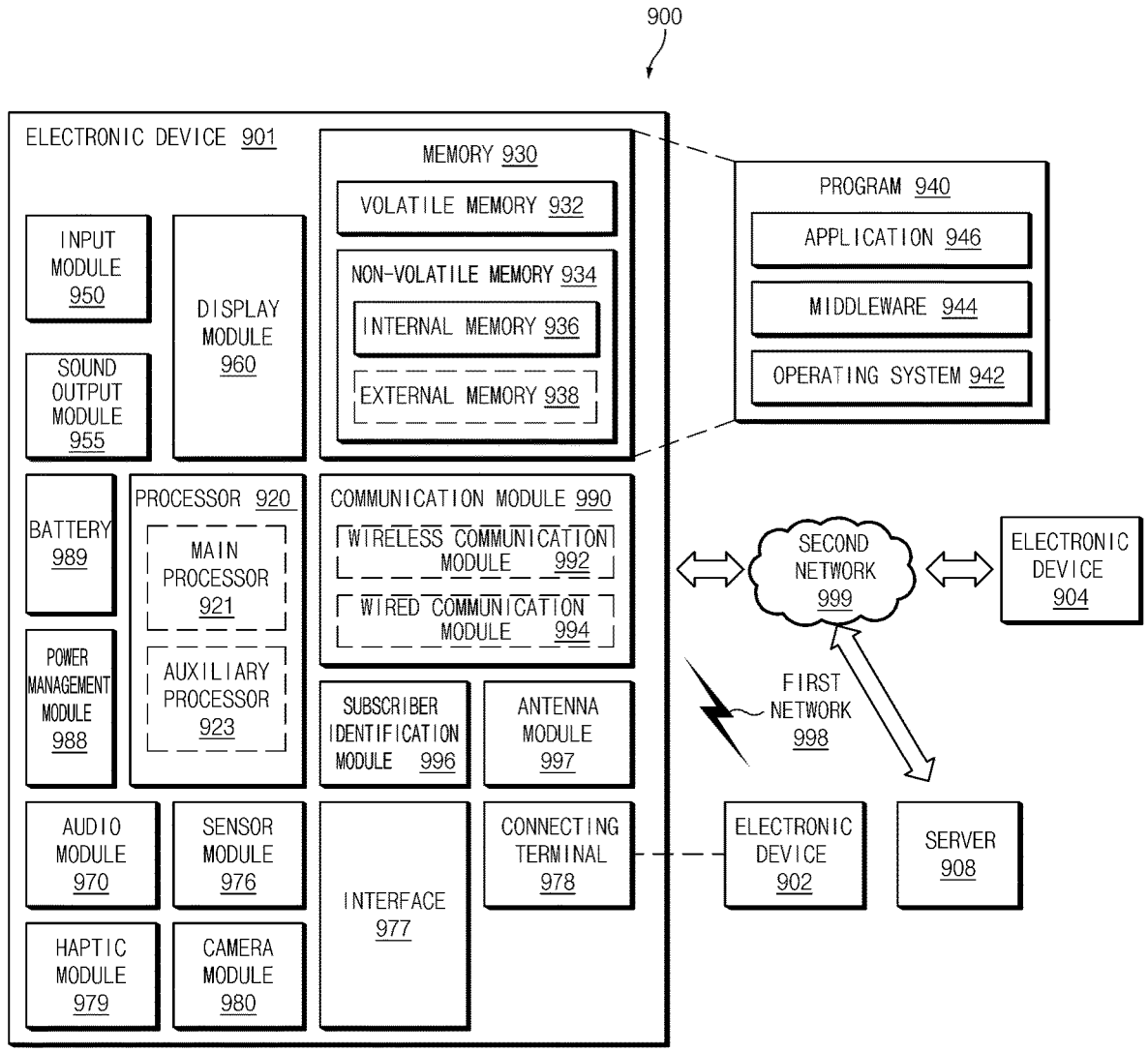
FIG. 9 is a block diagram illustrating an electronic device in a network environment according to various embodiments.
Figure 10:
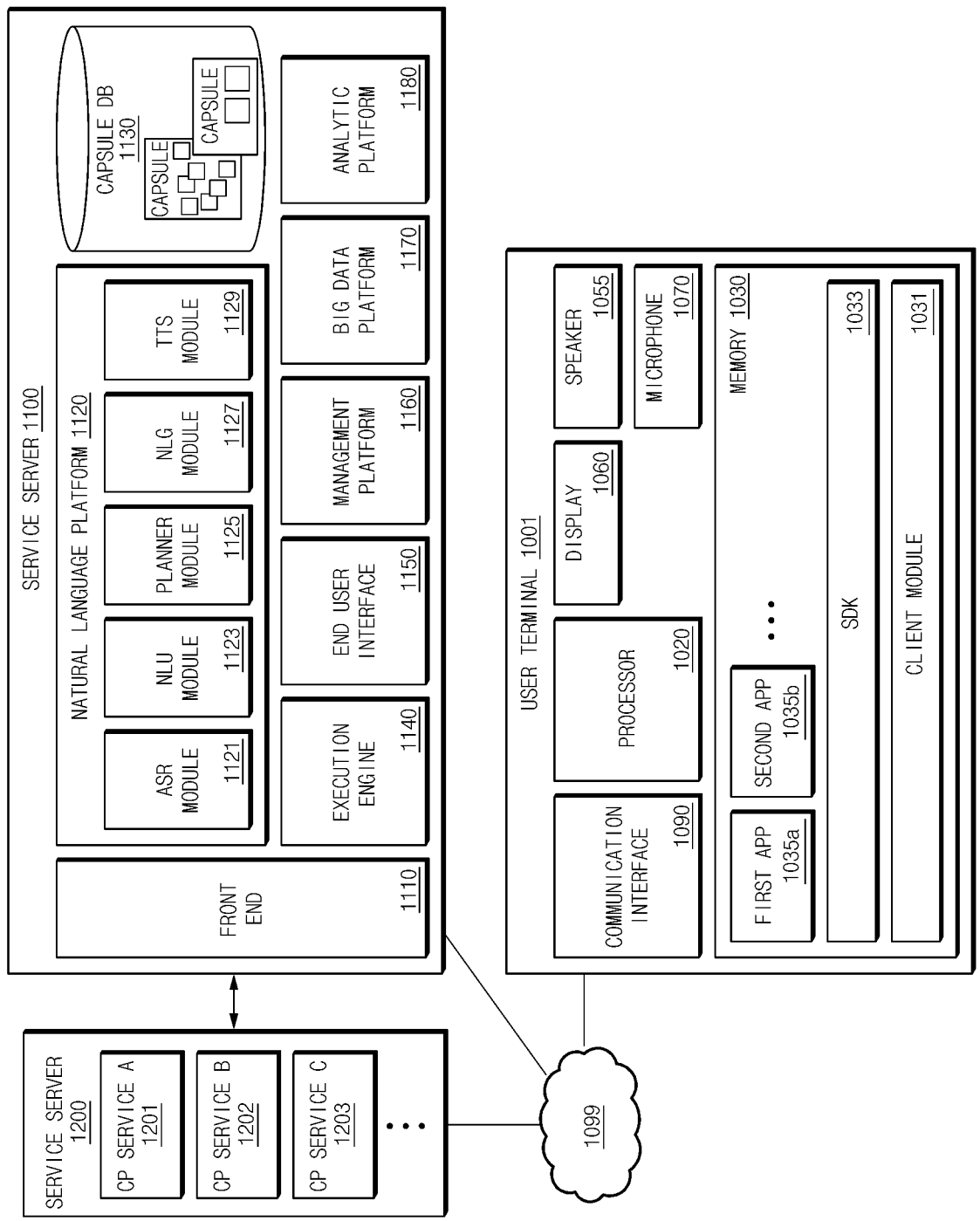
FIG. 10 is a block diagram illustrating an integrated intelligence system, according to one or more embodiments.

According to an embodiment, a voice assistance system may include a plurality of electronic devices (e.g., a first device 110, a second device 120, a third device 130, a fourth device 140, and a fifth device 150) and a server device 190 (e.g., first to sixth devices of FIGS. 3 to 6, an electronic device 901 of FIG. 9, or a user terminal 1100 of FIGS. 10 to 12) (e.g., the server device 190 in FIG. 1, an electronic device 200 in FIG. 2, an electronic device 305, 405, 505, or 605 in FIGS. 3 to 6, the server 908 in FIG. 9, or an intelligent server 1100 or a service server 1200 in FIG. 10). According to an embodiment, FIG. 1 shows five electronic devices, but the disclosure is not limited thereto, and the number of electronic devices may vary.

Hereinafter, the first device 110 is a receiving device that receives a user utterance, and the second device 120, the third device 130, the fourth device 140, and the fifth device 150 are located in the same space (e.g., a common space, a home, an adjacent location/space/place, etc.). For example, the first device 110, the second device 120, and the fifth device 150 may be devices included in the same user account (e.g., a group user account); the third device 130 may be a router device; and, the fourth device 140 may be an unregistered device unregistered in a user account.

According to an embodiment, the first device 110 may include an input module 111 and a location information module 113. For example, the input module 111 may include at least one microphone. The input module 111 may receive a user utterance (e.g., "turn on an air conditioner") from a user. The input module 111 may transmit information corresponding to the user utterance to the server device 190. The location information module 113 may obtain location information of the first device 110. For example, the location information module 113 may obtain GPS information of the first device 110 and/or may obtain location information based on wireless network connection information. For example, the location information module 113 may transmit location information to the server device 190.

According to an embodiment, the second device 120 and the fifth device 150 may include input modules 121 and 151, communication circuits 123 and 153, and action executors 125 and 155, respectively. For example, each of the second device 120 and the fifth device 150 may be a receiving device for receiving a user utterance and/or an execution device for performing at least part of an action corresponding to a user utterance; each of the input modules 121 and 151 may receive the user utterances; each of the communication circuits 123 and 153 may exchange data with other devices; and each of the action executors 125 and 155 may execute at least part of an action corresponding to the user utterance based on commands or information received from the server device 190.

According to an embodiment, the third device 130 (e.g., a router device) may store and manage an IP address and/or MAC address of a device connected to the third device 130. For example, the third device 130 may include a communication circuit 131 and an access device management module 133. The communication circuit 131 may exchange data and/or information with another device. The access device management module 133 may store and manage information of devices (e.g., the second device 120, the fourth device 140, and the fifth device 150) connected to the same network.

According to an embodiment, the fourth device 140 may include a communication circuit 141. The fourth device 140 may be connected to the third device 130 through the communication circuit 141. For example, the fourth device 140 may be a device unregistered in a user account and may be a device of another user registered in another user account.

According to an embodiment, the server device 190 may include an utterance analysis module 191, an account registration device management module 193, an account registration device user analysis module 195, and a dialog manager 197.

According to an embodiment, the utterance analysis module 191 may determine the intent and/or domain of a user input (e.g., a user utterance) by performing natural language processing on a user utterance obtained from the user. For example, the utterance analysis module 191 may analyze the user utterance and then may determine whether the analyzed user utterance is an utterance for controlling an electronic device. For example, the utterance analysis module 191 may generate a natural language processing result of a user input, based on natural language understanding. According to an embodiment, the utterance analysis module 191 may include an auto speech recognition module (ASR) and a natural language understanding module (NLU).

According to an embodiment, the ASR may generate text data expressing the received utterance in a specified language. The ASR may generate text data by using an acoustic model and a language model. The acoustic model may include information associated with phonation, and the language model may include unit phoneme information and information about a combination of unit phoneme information. For example, the ASR may convert a user utterance into text data by using information associated with the phonation and the unit phoneme information. According to an embodiment, the NLU may grasp the intent for a user input or may grasp a matching domain, by using a natural language processing model with respect to text data generated by the ARS. The NLU may obtain a component (e.g., slots or task parameters) necessary to express the user's intent. For example, the NLU may process utterance data based on syntactic analysis and semantic analysis. The domain or intent corresponding to the utterance is determined based on the processing result, and the component necessary to express the user's intent may be obtained.

For example, the utterance analysis module 191 may receive information corresponding to a user utterance from the first device 110. The utterance analysis module 191 may determine at least part of an action corresponding to a user utterance or an execution device (e.g., the second device 120) for performing the at least part of an action corresponding to a user utterance based on information corresponding to the user utterance.

According to an embodiment, the account registration device management module 193 may manage information of devices registered in a user account (e.g., a group user account). For example, the account registration device management module 193 may store and manage information (e.g., the type of a device, the performance of a device, a function of a device, a configuration (e.g., the presence or absence of a speaker, a display, and/or a microphone) of a device, and/or place information of a device) related to a user, which is registered in a user account, and the user's device. For example, the account registration device management module 193 may identify location information of the first device 110 (e.g., a receiving device) and the second device 120 (e.g., an execution device). For example, the account registration device management module 193 may receive location information of the first device 110 from the first device 110 (e.g., the location information module 113). For example, the account registration device management module 193 may determine whether the first device 110 and the second device 120 are located in the same space, based on GPS information of each of the first device 110 and the second device 120, place information recorded in user account information, and/or network connection information. For example, when the first device 110 and the second device 120 are connected to the same network, the account registration device management module 193 may determine that the first device 110 and the second device 120 are located in the same space. For example, the account registration device management module 193 may determine whether the first device 110 and the second device 120 are in the same space, by comparing GPS information of the first device 110 with GPS information of the second device 120.

According to an embodiment, the account registration device user analysis module 195 may determine whether there is an unregistered device (e.g., the fourth device 140) unregistered in a user account in the same space as the second device 120. For example, the account registration device user analysis module 195 may determine whether there is an unregistered device, based on user account information and network connection information of the second device 120 (or the third device 130). For example, the user account information may include account registration ID, a device model number, a device phone number, a device serial number, a device IMEI number, MAC address, and/or place information where a device is located. For example, the account registration device user analysis module 195 may obtain information of devices included in a wireless network to which the second device 120 is connected. For example, the account registration device user analysis module 195 may store the MAC address of a device registered in the user account. For example, the account registration device user analysis module 195 may receive information of devices connected to the same network as the second device 120 from the second device 120, or may receive information of devices connected to the same network from the third device 130 (e.g., the access device management module 133). For example, the account registration device user analysis module 195 may determine whether a device is registered in a user account, by using MAC address. For example, when there is information of a device, which is not registered in the user account, from among received pieces of information of devices, the account registration device user analysis module 195 may determine that the unregistered device is present in the same space as the second device 120. For example, when recognizing that the unregistered device is present in the same space as the second device 120, the account registration device user analysis module 195 may determine a device (e.g., notification output device) for outputting a notification to inform that the execution device (e.g., the second device 120) is controlled by the user. For example, the account registration device user analysis module 195 may determine the notification output device among devices (e.g., the second device 120 and the fifth device 150) registered in a user account in the same space as the second device 120. For example, the account registration device user analysis module 195 may visually or audibly recognize a device capable of outputting a notification (e.g., a natural language message), and may determine the corresponding device as a notification output device. The account registration device user analysis module 195 may transmit a notification and/or a command for outputting the notification to a notification output device.

According to an embodiment, the dialog manager 197 may execute commands and functions according to intent by using information including user intent and parameters (or slots) predicted through the analysis of a user utterance, and may generate a response (e.g., a result of performing at least part of the action corresponding to the user utterance) to be provided to the user. The dialog manager 197 may generate information indicating a device control state as a natural language message, and then may provide the natural language message to a device registered in a user account. According to an embodiment, when the account registration device user analysis module 195 determines that there is an unregistered device (e.g., the fourth device 140), the dialog manager 197 may generate a notification to notify that the execution device (e.g., the second device 120) is controlled by the user. For example, the notification may include a natural language message (e.g., "user 1 (user ID) has turned on the second device 120 (e.g., an air conditioner)") indicating that the execution device (e.g., the second device 120) is controlled by the user. For example, the dialog manager 197 may deliver the generated notification to the account registration device user analysis module.

According to an embodiment, the dialog manager 197 may include a natural language generator (NLG) 1971, a user interface (UI) generator 1973, and an action executor 1975.

According to an embodiment, the NLG 1971 may generate data generated during natural language processing in a natural language form. The data generated in the natural language form may be the result of natural language understanding. For example, the NLG 1971 may generate an execution result indicating whether a control action corresponding to a control utterance has been performed by a plurality of executors, in a natural language form.

According to an embodiment, the UI generator 1973 may generate a UI screen for providing the natural language generated by the NLG 1971.

According to an embodiment, to provide a voice assistance service, the action executor 1975 may allow an execution device (e.g., the second device 120) that performs at least part of an action corresponding to a user utterance to execute a specific action.

According to various embodiments, a configuration of the voice assistance system and components of the plurality of electronic devices (e.g., the first device 110, the second device 120, the third device 130, the fourth device 140, and the fifth device 150), and the server device 190 may be changed. For example, at least some components of one or more of the plurality of electronic devices (e.g., the first device 110, the second device 120, the third device 130, the fourth device 140, and the fifth device 150), and the server device 190 may be omitted or new components may be added. According to various embodiments, at least one of the plurality of electronic devices (e.g., the first device 110, the second device 120, the third device 130, the fourth device 140, and the fifth device 150) may perform at least part of operations of the server device 190. The server device 190 may perform at least some operations of the plurality of electronic devices (e.g., the first device 110, the second device 120, the third device 130, the fourth device 140, and the fifth device 150). For example, at least one of the plurality of electronic devices (e.g., the first device 110, the second device 120, the third device 130, the fourth device 140, and the fifth device 150) may be integrated with the server device 190, and may constitute an on-device device. According to an embodiment, the utterance analysis module 191, the account registration device management module 193, the account registration device user analysis module 195, and the dialog manager 197 of the server device 190 may be implemented as one integrated component (e.g., a processor 230 in FIG. 2). Alternatively, at least some of operations of the utterance analysis module 191, the account registration device management module 193, the account registration device user analysis module 195, and the dialog manager 197 may be performed by a processor of the electronic device 200.

According to an embodiment, the voice assistance system may allow an execution device to perform at least part of an action corresponding to a user utterance based on the user utterance received from a receiving device related to a voice assistance service, and may provide devices located in the same space (or surroundings) as an execution device with a notification that the user controls the execution device by using the receiving device. Accordingly, another user other than the user employing the receiving device, or another device other than the receiving device and/or the execution device may also know that a specific device is being controlled by the user.

FIG. 2 is a block diagram of an electronic device, according to one or more embodiments.

According to an embodiment, an electronic device 200 (e.g., the server device 190 in FIG. 1, the electronic device 200 in FIG. 2, the electronic device 305, 405, 505, or 605 in FIGS. 3 to 6, the server 908 in FIG. 9, or the intelligent server 1100 or the service server 1200 in FIG. 10) may include a communication circuit 210, a memory 220, and a processor 230.

Figure 11:
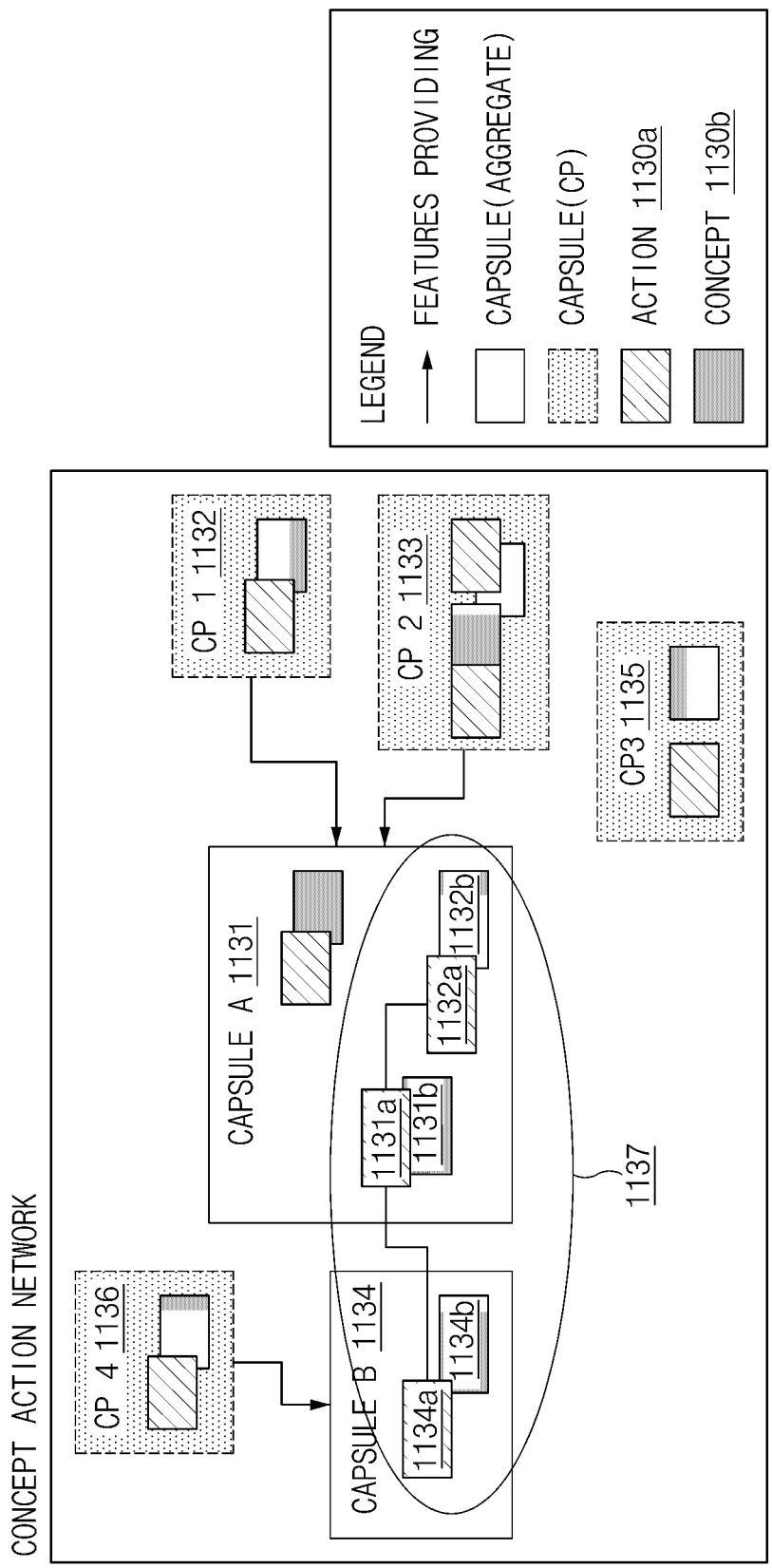
FIG. 11 is a diagram illustrating a form in which relationship information between a concept and an action is stored in a database, according to one or more embodiments.
Figure 12:
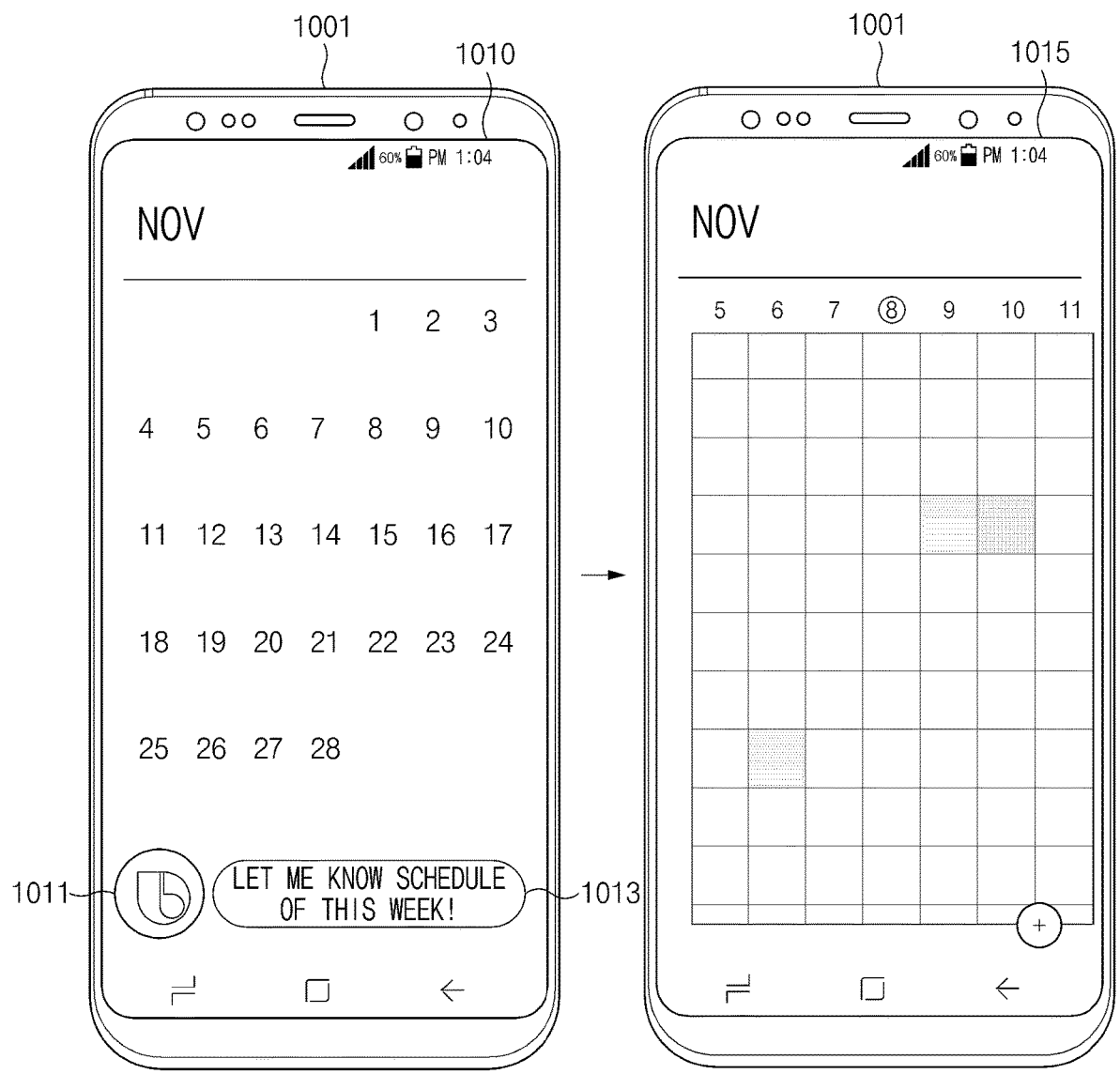
FIG. 12 is a view illustrating a user terminal displaying a screen of processing a voice input received through an intelligence app, according to one or more embodiments.

According to an embodiment, the communication circuit 210 may transmit/receive information and/or data to/from an external electronic device (e.g., the first to fifth devices 110, 120, 130, 140, and 150 in FIG. 1, first to sixth devices 310 to 340, 410 to 450, 510 to 560, 610 to 650 in FIGS. 3 to 6, the electronic device 200 or 101 of FIG. 9, or the user terminal 1200 of FIGS. 10 to 12) or an external server device.

According to an embodiment, the memory 220 may store one or more instructions that, when executed by the processor 230, cause the processor 230 to control an operation of the electronic device 200. The memory 220 may at least temporarily store information and/or data (e.g., data related to a user utterance, information related to an external electronic device (e.g., location information or network connection information), user account information (e.g., account registration ID, a device model number, a device phone number, a device serial number, a device IMEI number, MAC address, and/or place information where a device is located), information of an unregistered electronic device, information of a receiving device and/or an execution device, a notification, and/or information about at least part of an action corresponding to a user utterance) related to an operation of the electronic device 200.

According to an embodiment, the processor 230 may receive information corresponding to a user utterance from a first external electronic device. For example, the first external electronic device may be a receiving device that receives a user utterance to provide a voice assistance service. According to an embodiment, the first external electronic device may be located in a different place (e.g., a remote location) from a place of each of a second external electronic device and a third external electronic device.

According to an embodiment, the processor 230 may recognize the second external electronic device, which will perform at least part of an action corresponding to a user utterance, from information corresponding to the user utterance. For example, the second external electronic device may be an execution device that performs at least part of an action corresponding to a user utterance to provide a voice assistance service.

According to an embodiment, the processor 230 may determine whether the first external electronic device and the second external electronic device are in the same space. For example, the processor 230 may determine whether the first external electronic device and the second external electronic device are located within a specified range (hereinafter referred to as 'first specified range'). For example, the specified range may be a pre-specified value, or may be set or changed according to a user input. For example, the specified range can be set to a value that represents within the range or boundaries of a specified location (e.g., home, business, specific area/place/building). For example, the processor 230 may receive at least part of location information or network connection information of the first external electronic device from the first external electronic device, and may receive at least part of location information or network connection information of the second external electronic device from the second external electronic device. The processor 230 may determine whether the first external electronic device is adjacent to the second external electronic device, based on at least part of the location information or the network information of each of the first external electronic device and the second external electronic device. For example, the processor 230 may determine whether the first external electronic device and the second external electronic device are located within the specified range based on at least part of the location information or the network information of each of the first external electronic device and the second external electronic device.

According to an embodiment, on the basis of the determination that the first external electronic device and the second external electronic device are not located in the same space, the processor 230 may determine an external electronic device that provides a notification related to at least part of an action corresponding to a user utterance among the second external electronic device and at least one third external electronic device located in the same space as the second external electronic device. For example, based on the determination that the first external electronic device and the second external electronic device are not located within the first specified range, the processor 230 may determine an external electronic device that provides a notification related to at least part of an action corresponding to a user utterance among the second external electronic device and at least one third external electronic device located within a second specified range from the second external electronic device. For example, the first specified range and the second specified range may be the same or different. For example, a notification related to at least part of the action corresponding to the user utterance may include information indicating that the second external electronic device performs at least part of an action corresponding to the user utterance in response to the user utterance received from the first external electronic device. For example, the processor 230 may generate a natural language message corresponding to the notification. The processor 230 may determine a device, which is capable of visually or audibly outputting a natural language message corresponding to the notification, from among the second external electronic device and the at least one third external electronic device as an external electronic device that provides the notification.

According to an embodiment, the processor 230 may determine whether there is an unregistered electronic device, which is not registered in the same user account as the first external electronic device and the second external electronic device, from among the at least one third external electronic device. According to an embodiment, the processor 230 may receive information of the at least one third external electronic device, which is connected to an access point device over a network, from the access point device placed in the same space as the second external electronic device. For example, the processor 230 may receive information about at least one third external electronic device, which is connected to an access point device over a network, from the access point device connected to the second external electronic device through a network. For example, the second external electronic device and the at least one third external electronic device may be connected to the access point device through the same network or through different networks. The processor 230 may recognize the unregistered electronic device based on the pre-stored user account information and the information of the at least one third external electronic device. The processor 230 may receive user account information (e.g., account registration ID, a device model number, a device phone number, a device serial number, a device IMEI number, MAC address, and/or place information where the device is located) from the first external electronic device or the second external electronic device. The processor 230 may recognize a device registered in a user account and an unregistered electronic device unregistered in the user account based at least partly on the user account information. For example, the processor 230 may determine whether the external device is a device registered to a user account, by using the MAC address. The processor 230 may determine an external electronic device, which will provide a notification, from among the second external electronic device and the at least one third external electronic device other than the unregistered electronic device.

According to an embodiment, when there is no unregistered electronic device in a space the same as or adjacent to a space in which the second external electronic device is present (e.g., a location within a specified range from the second external electronic device), the processor 230 may not determine an external electronic device for providing a notification and may not perform an operation of providing the notification.

According to an embodiment, the processor 230 may not determine an external electronic device for providing the notification and may not perform an operation of providing the notification, based on the determination that the first external electronic device and the second external electronic device are in the same space (e.g., determination that the first external electronic device and the second electronic device are located within a specified range).

According to an embodiment, the processor 230 may transmit a command for providing a notification to the determined external electronic device. According to an embodiment, the processor 230 may transmit a natural language message corresponding to the notification and/or a command for outputting the natural language message to an external electronic device that provides the notification. According to an embodiment, the processor 230 may transmit at least part of information indicating that the notification has been provided, or information indicating that the unregistered electronic device is present in the same space as the second external electronic device to the first external electronic device. According to an embodiment, on the basis of the case that the first external electronic device and the second external electronic device are in the same space, the case that the first external electronic device and the second external electronic device are not in the same space, the case that there is an unregistered electronic device in the same space as the second external electronic device, or the case that there is no unregistered electronic device in the same space as the second external electronic device, the processor 230 may generate a notification including types, forms, and/or contents different from each other, or may transmit a command that allows the determined external electronic device to provide different notifications.

According to an embodiment, the processor 230 may transmit a command for performing at least part of an action corresponding to a user utterance to the second external electronic device. According to an embodiment, the processor 230 may receive information about a result of performing at least part of the action corresponding to the user utterance from the second external electronic device. The processor 230 may transmit information about a result of performing at least part of the action corresponding to the user utterance to the first external electronic device.

According to an embodiment, the electronic device 200 may further include at least part of the components included in the server device 190 of FIG. 1, the electronic device 901 of FIG. 9, the intelligence server 1100 or the service server 1200 of FIGS. 10-12.

According to an embodiment, the electronic device 200 may allow an execution device to perform at least part of an action corresponding to a user utterance based on the user utterance received from a receiving device related to a voice assistance service, and may provide devices located in the same space (or surroundings) as an execution device with a notification that the user controls the execution device by using the receiving device. Accordingly, another user other than the user employing the receiving device, or another device other than the receiving device and/or the execution device may also know that a specific device (e.g., an execution device) is being controlled by the user.

Figure 3:
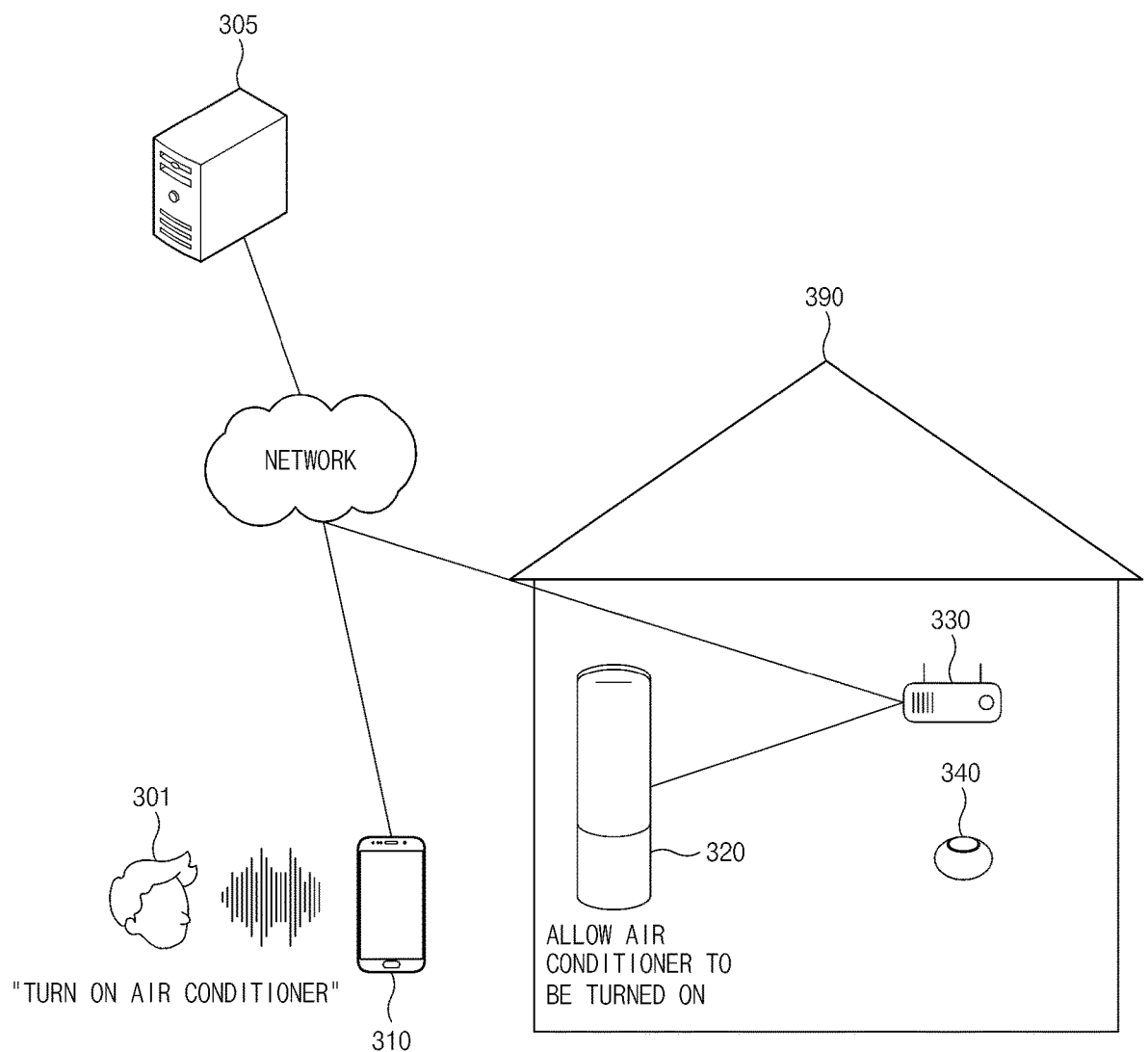
FIG. 3 is a diagram illustrating an operation of an electronic device, according to one or more embodiments.

FIG. 3 is a diagram illustrating an operation of an electronic device, according to one or more embodiments.

According to an embodiment, a user 301 may input a user utterance for controlling a second device 320 to a first device 310 in a place separated from a place (e.g., a same space) 390 where the second device 320 is located. For example, the first device 310 may receive a user utterance ("turn on an air conditioner") and may transmit information corresponding to the received user utterance to the electronic device 305 (e.g., a server device related to a voice assistance service) (e.g., the server device 190 in FIG. 1, the electronic device 200 in FIG. 2, the electronic device 305, 405, 505, or 605 in FIGS. 3 to 6, the server 908 in FIG. 9, or the intelligent server 1100 or the service server 1200 of FIG. 10). The electronic device 305 may recognize a device (e.g., the second device 320 (e.g., an air conditioner)) for performing at least part of an action corresponding to a user utterance based on information corresponding to the user utterance.

According to an embodiment, the electronic device 305 may determine whether the first device 310 is in the same space 390 (or an adjacent location, place, or space) (e.g., home) as the second device 320. For example, the electronic device 305 may determine whether the first device 310 and the second device 320 are in the same space 390 based on location information (e.g., GPS information) or network connection information (e.g., the connected network IP address, information of the connected router device (e.g., a third device 330), MAC address, or SSID) of the first device 310 and location information (e.g., GPS information, MAC address, or place information registered in a user account) or network connection information of the second device 320. For example, when it is determined that the first device 310 and the second device 320 are not in the same space 390, the electronic device 305 may determine whether an unregistered device is present in the same space 390 as the second device 320. For example, the electronic device 305 may determine whether there is an unregistered device unregistered in the user account in the same space 390 as the second device 320 based on user account information and the network connection information of the second device 320. For example, the user account may include a group user account (e.g., a family group account). For example, the electronic device 305 may receive information of devices (e.g., the third device 330 and/or the fourth device 340) connected to the same network as the second device 320 from the second device 320. For example, the electronic device 305 may receive information of devices connected to the third device 330 from the third device 330 (e.g., a router device) to which the second device 320 is connected. The electronic device 305 may recognize whether there is an unregistered device in the same space 390 as the second device 320, by comparing the user account information and received device information. For example, the unregistered device may be a device (e.g., a device registered in another user account) of another user different from the user 301 of the first device 310. The electronic device 305 may determine whether another user is present in the same space 390 as the second device 320, based on information of a device registered in the user account and/or information (e.g., an account login) received from devices in the same space 390 as the second device 320.

According to an embodiment, when it is determined that there is no other user present in the same space 390 (e.g., another user's device registered in the group user account) and an unregistered device is present in the same space 390 as the second device 320 (e.g., when it is determined that there is no other user in the same space 390), the electronic device 305 may allow the second device 320 to perform at least part of an action corresponding to a user utterance, and may provide the first device 310 with information about a result of performing at least part of the action corresponding to the user utterance. According to an embodiment, the electronic device 305 may not provide a notification indicating that the user 301 controls the second device 320 through the first device 310 from the outside, based on the determination that there is no other user in the same space 390 as the second device 320.

Figure 4:
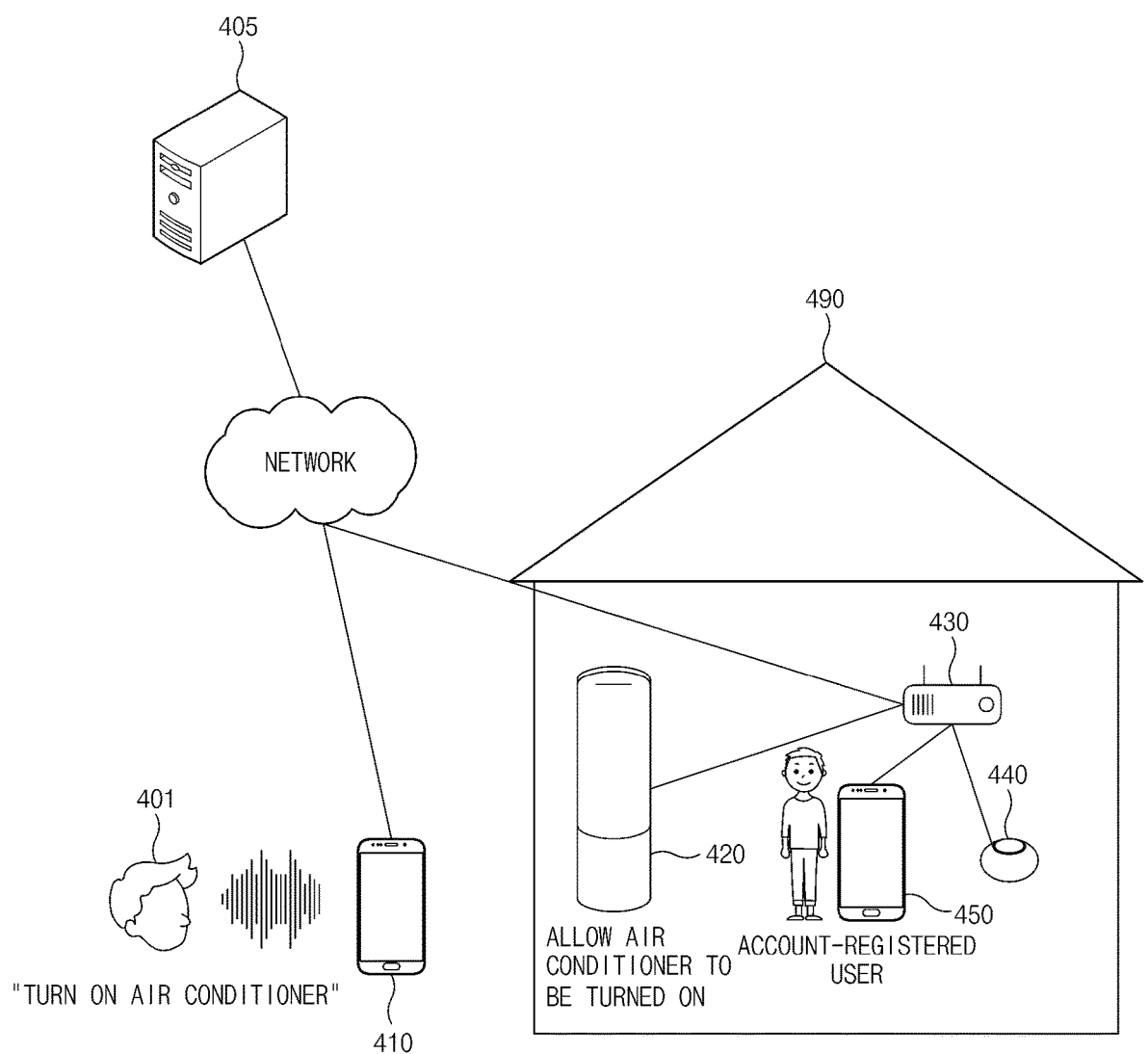
FIG. 4 is a diagram illustrating an operation of an electronic device, according to one or more embodiments.

FIG. 4 is a diagram illustrating an operation of an electronic device, according to one or more embodiments. Hereinafter, descriptions identical to those of FIG. 3 will be omitted or briefly described.

According to an embodiment, a first device 410 may receive a user utterance ("turn on an air conditioner") and may transmit information corresponding to the received user utterance to an electronic device 405 (e.g., a server device related to a voice assistance service) (e.g., the server device 190 in FIG. 1, the electronic device 200 in FIG. 2, the electronic device 305, 405, 505, or 605 in FIGS. 3 to 6, the server 908 in FIG. 9, or the intelligent server 1100 or the service server 1200 of FIG. 10).

According to an embodiment, the electronic device 405 may determine whether the first device 410 is in the same space 490 as a second device 420. The electronic device 405 may determine whether there is an unregistered device unregistered in the user account in the same space 490 as the second device 420 based on user account information and network connection information of the second device 420. For example, the electronic device 405 may determine whether a registered user or an unregistered user is present in the same space 490, based on information of devices connected to the third device 430 (e.g., a router device) to which the second device 420 is connected. For example, the electronic device 405 may recognize that the second device 420 (e.g., an air conditioner), a fourth device 440 (e.g., a smart speaker), and a fifth device 450 (e.g., another user's device registered in the user account) are connected to the third device 430, based on network connection information. For example, the fifth device 450 may be another user's device registered in the same group user account as the first device 410.

According to an embodiment, on the basis of the determination that the first device 410 and the second device 420 are not located in the same space 490, and another user's device (e.g., the fifth device 450) registered in a user account (or group user account) is located in the same space 490 as the second device 420, the electronic device 405 may allow the second device 420 to perform at least part of an action corresponding to a user utterance, and may provide the first device 410 and the fifth device 450 with information about a result of performing at least part of the action corresponding to the user utterance.

According to an embodiment, the electronic device 405 may not separately provide a notification indicating that the user 401 controls the second device 420 through the first device 410 from the outside, based on the determination that there is no unregistered user in the user account in the same space 490 as the second device 420.

Figure 5:
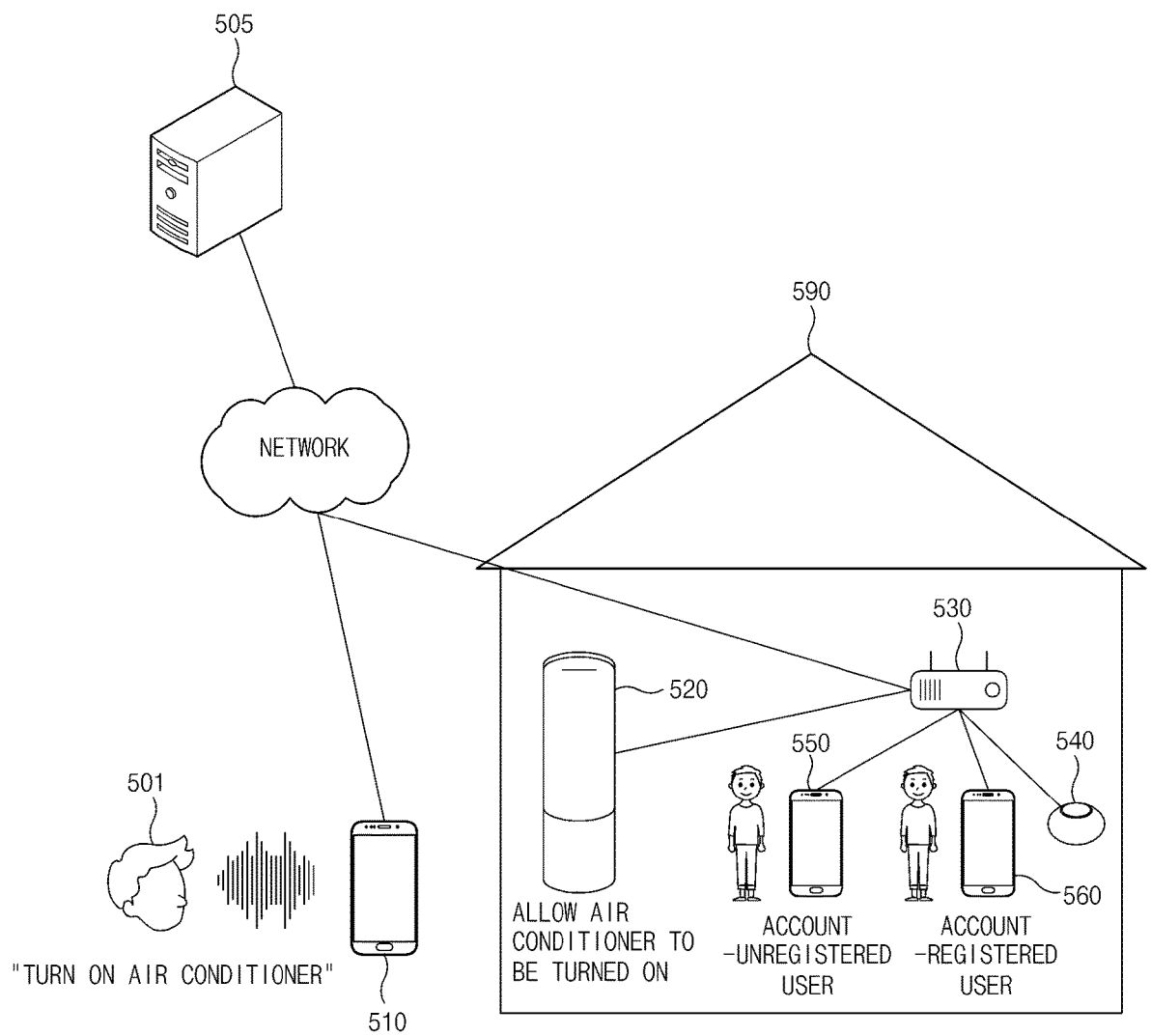
FIG. 5 is a diagram illustrating an operation of an electronic device, according to one or more embodiments.

FIG. 5 is a diagram illustrating an operation of an electronic device, according to one or more embodiments. Hereinafter, descriptions identical to those of FIGS. 3 and 4 will be omitted or briefly described.

According to an embodiment, a first device 510 may receive a user utterance ("turn on an air conditioner") and may transmit information corresponding to the received user utterance to an electronic device 505 (e.g., a server device related to a voice assistance service) (e.g., the server device 190 in FIG. 1, the electronic device 200 in FIG. 2, the electronic device 305, 405, 505, or 605 in FIGS. 3 to 6, the server 908 in FIG. 9, or the intelligent server 1100 or the service server 1200 of FIG. 10).

According to an embodiment, the electronic device 505 may determine whether the first device 510 is in the same space 590 as a second device 520. The electronic device 505 may determine whether there is an unregistered device unregistered in the user account in the same space as the second device 520 based on user account information and network connection information of the second device 520. For example, the electronic device 505 may determine whether a registered user or an unregistered user is present in the common space, based on information of devices connected to the third device 530 (e.g., a router device) to which the second device 520 is connected. For example, the electronic device 505 may recognize that the second device 520 (e.g., an air conditioner), a fourth device 540 (e.g., a smart speaker), and a fifth device 550 (e.g., another user's device unregistered in the user account), a sixth device 560 (e.g., another user's device registered in the user account) are connected to a third device 530, based on network connection information.

According to an embodiment, on the basis of the determination that the first device 510 and the second device 520 are located in different places from each other, and another user's device (e.g., the sixth device 560) registered in a user account (or group user account) is located in the same space as the second device 520, the electronic device 505 may allow the second device 520 to perform at least part of an action corresponding to a user utterance, and may provide the first device 510 and the sixth device 560 with information about a result of performing at least part of the action corresponding to the user utterance.

According to an embodiment, the electronic device 505 has recognized that there is an unregistered user (e.g., the fifth device 550 unregistered in the user account) unregistered in the user account in the same space as the second device 520. However, the electronic device 505 may not separately provide a notification indicating that the user 501 controls the second device 520 through the first device 510 from the outside, based on the determination that another user (e.g., the sixth device 560 of another user registered in the user account) registered in the user account is present in the same space. According to an embodiment, when there is an unregistered user (e.g., the fifth device 550 unregistered in the user account) unregistered in the user account regardless of whether there is another user's sixth device 560 registered in the user account in the same space as the second device 520, the electronic device 505 may provide a notification that the user 501 controls the second device 520 through the first device 510 from the outside. For example, the electronic device 505 may determine a device for providing a notification among devices in the same space as the second device 520, and may transmit a command for outputting a notification to the determined device. For example, the electronic device 505 may generate a natural language message corresponding to the notification and may determine a device (e.g., a device including a speaker) suitable for outputting the natural language message. The electronic device 505 may transmit a command for outputting a natural language message together with a natural language message to the determined device.

According to an embodiment, the electronic device 505 may provide notifications having different types and/or different contents depending on whether there is an unregistered user (e.g., the fifth device 550 unregistered in the user account) in the user account in the same space 590 as the second device 520. For example, when there is no unregistered user (e.g., the fifth device 550 unregistered in the user account) in the same space 590 as the second device 520, the electronic device 505 may allow a device for providing the notification to output a simple beep (e.g., "ding-dong"). For example, when there is an unregistered user (e.g., the fifth device 550 unregistered in the user account) in the same space 590 as the second device 520, the electronic device 505 may allow a device for providing a notification to output a detailed notification (e.g., "a second device (e.g., an air conditioner) will start operating soon by a user").

According to an embodiment, when there is an unregistered user (e.g., the fifth device 550 unregistered in the user account) registered in the user account and another user (e.g., the sixth device 560 registered in the user account) registered in the user account in the same space as the second device 520, the electronic device 505 may provide the unregistered user (e.g., the fifth device 550 unregistered in the user account) and the other user (e.g., the sixth device 560 registered in the user account) registered in the user account with a notification that the user 501 controls the second device 520 from the outside through the first device 510. For example, the electronic device 505 may provide the fifth device 550 and the sixth device 560 with notifications having different types and/or different contents.

Figure 6:
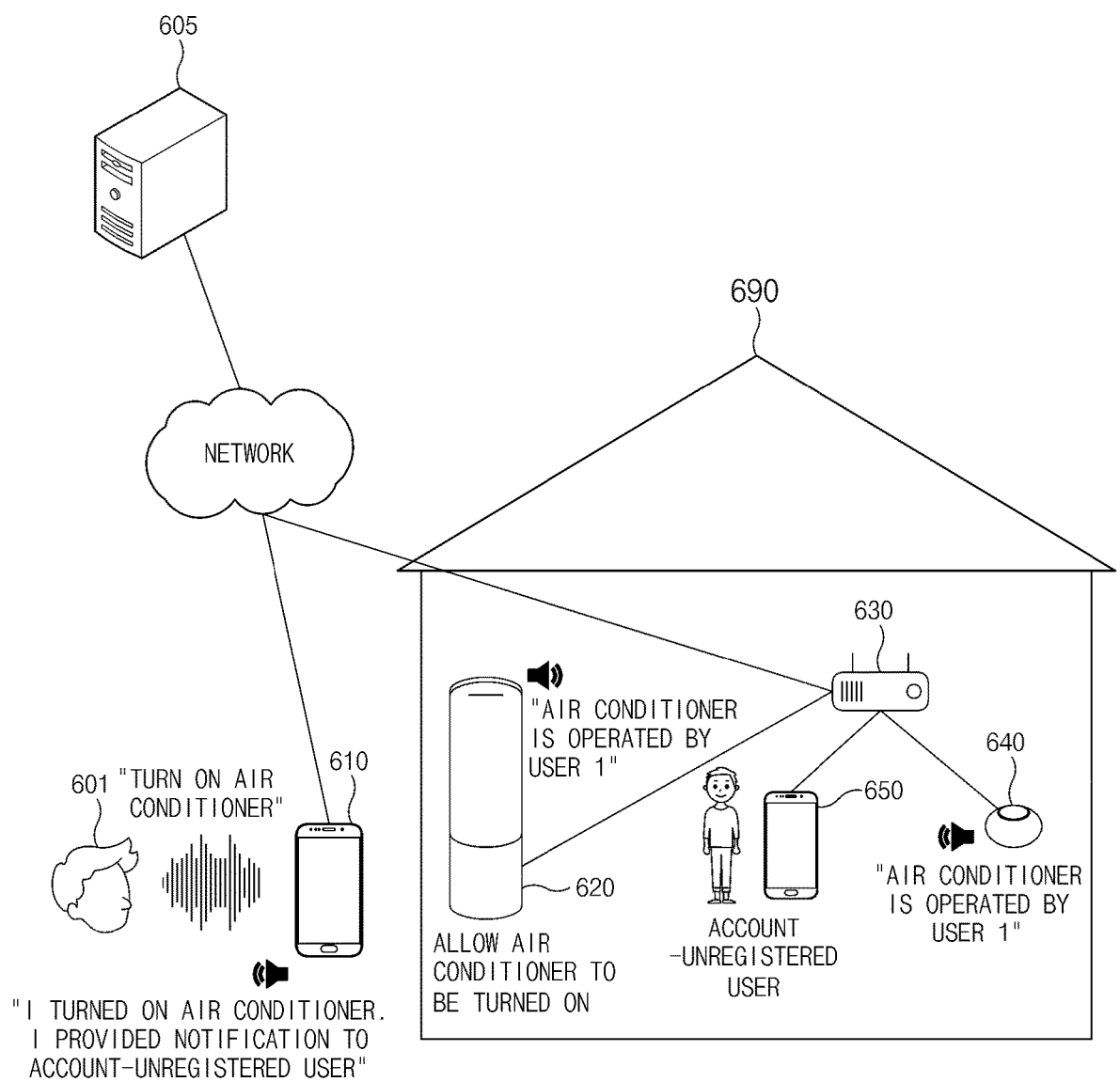
FIG. 6 is a diagram illustrating an operation of an electronic device, according to one or more embodiments.

FIG. 6 is a diagram illustrating an operation of an electronic device, according to one or more embodiments. Hereinafter, descriptions identical to those of FIGS. 3-5 will be omitted or briefly described.

According to an embodiment, a first device 610 may receive a user utterance ("turn on an air conditioner") and may transmit information corresponding to the received user utterance to an electronic device 605 (e.g., a server device related to a voice assistance service) (e.g., the server device 190 in FIG. 1, the electronic device 200 in FIG. 2, the electronic device 305, 405, 505, or 605 in FIGS. 3 to 6, the server 908 in FIG. 9, or the intelligent server 1100 or the service server 1200 of FIG. 10).

According to an embodiment, the electronic device 605 may determine whether the first device 610 is in the same space 690 as a second device 620. The electronic device 605 may determine whether there is an unregistered device unregistered in the user account in the same space as the second device 620 based on user account information and network connection information of the second device 620. For example, the electronic device 605 may determine whether a registered user or an unregistered user is present in the common space, based on information of devices connected to the third device 630 (e.g., a router device) to which the second device 620 is connected. For example, the electronic device 605 may recognize that the second device 620 (e.g., an air conditioner), a fourth device 640 (e.g., a smart speaker), and a fifth device 650 (e.g., another user's device unregistered in the user account) are connected to the third device 630, based on network connection information.

According to an embodiment, the electronic device 605 may determine a device (e.g., notification output device) for providing a notification that the user 601 is controlling the second device 620 through the first device 610, based on the determination that the first device 610 and the second device 620 are in different places from each other, and there is another user's device (e.g., the fifth device 650) unregistered in a user account (or a group user account) in the same space as the second device 620. For example, the electronic device 605 may determine, as a notification output device, a device, which is capable of outputting a natural language message, from among devices placed in the same space as the second device 620. For example, the electronic device 605 may determine the second device 620 and/or the fourth device 640 capable of outputting a natural language message through a speaker as the notification output device. For example, when determining that an execution device (e.g., the second device 620) fails to support a function for outputting a notification (e.g., a natural language message), the electronic device 605 may determine the fourth device 640 supporting a function capable of outputting a notification as the notification output device. The electronic device 605 may generate a natural language message (e.g., an air conditioner is operated by the user 1 601") corresponding to a notification that the user 601 is controlling the second device 620 through the first device 610 and may transmit a command for outputting the natural language message to the notification output device. According to an embodiment, after allowing the notification output device to output the notification, the electronic device 605 may allow an execution device (e.g., the second device 620) to perform at least part of an action corresponding to a user utterance. For example, the electronic device 605 may transmit a command for performing at least part of the action corresponding to the user utterance to the execution device (e.g., the second device 620). According to an embodiment, the electronic device 605 may provide the first device 610 with information (e.g., "I turned on an air conditioner") about a result of performing at least part of the action corresponding to the user utterance. According to an embodiment, the electronic device 605 may provide information ("I provided a notification to an unregistered user") indicating that a notification has been provided to a receiving device (e.g., the first device 610) that has received the user utterance.

According to various embodiments, in FIGS. 3-6, a user is in a place different from the second device 320, 420, 520, or 620 (e.g., an execution device), but is not limited thereto. For example, even when the user is in the same space 390, 490, 590, or 690 as the second device 320, 420, 520, or 620, the electronic device 305, 405, 505, or 605 may or may not provide a notification indicating that the user is controlling the second device 320, 420, 520, or 620 through the first device, based on whether an unregistered device is present. For example, even when there is no unregistered device in the same space 390, 490, 590, or 690, the electronic device 305, 405, 505, or 605 may provide a notification indicating that the user is controlling the second device 320, 420, 520, or 620 through the first device 310, 320, 330, or 340, respectively. According to an embodiment, when there is no unregistered device and when there is an unregistered device, the electronic device 305, 405, 505, or 605 may provide a notification indicating that the second device 320, 420, 520, or 620 is controlled in a different way, or may determine contents of the notification differently.

According to an embodiment, the electronic device 305, 405, 505, or 605 may allow an execution device (e.g., the second device 320, 420, 520, or 620) to perform at least part of an action corresponding to a user utterance based on the user utterance received from a receiving device (e.g., the first device 310, 320, 330, or 340) related to a voice assistance service, and may provide devices located in the same space (or surroundings) as an execution device with a notification that the user controls the execution device by using the receiving device. Accordingly, another user other than the user employing the receiving device, or another device other than the receiving device and/or the execution device may also know that a specific device (execution device) is being controlled by the user.

According to an embodiment, an electronic device may include a communication circuit, a memory, and a processor. The memory may store instructions that, when executed by the processor, cause the electronic device to receive information corresponding to a user utterance from a first external electronic device, to recognize a second external electronic device, which will perform at least part of an action corresponding to a user utterance, from the information corresponding to the user utterance, to determine whether the first external electronic device and the second external electronic device are in the same space, to determine an external electronic device, which provides a notification related to at least part of the action corresponding to the user utterance, among the second external electronic device and at least one third external electronic device placed in the same space as the second external electronic device, based on determination that the first external electronic device and the second external electronic device are not in the same space, to transmit a command for providing the notification to the determined external electronic device, and to transmit a command for performing at least part of the action corresponding to the user utterance to the second external electronic device.

According to an embodiment, the instructions, when executed by the processor, may cause the electronic device to receive at least part of location information or network connection information of the first external electronic device from the first external electronic device, to receive at least part of location information or network connection information of the second external electronic device from the second external electronic device, and to determine whether the first external electronic device is adjacent to the second external electronic device, based on at least part of the location information or the network information of each of the first external electronic device and the second external electronic device.

According to an embodiment, the instructions, when executed by the processor, may cause the electronic device to determine whether there is an unregistered electronic device, which is not registered in the same user account as the first external electronic device and the second external electronic device, from among the at least one third external electronic device, and to determine an external electronic device, which will provide the notification, from among the second external electronic device and the at least one third external electronic device other than the unregistered electronic device.

According to an embodiment, the instructions, when executed by the processor, may cause the electronic device to receive information of the at least one third external electronic device, which is connected to an access point device over a network, from the access point device placed in the same space as the second external electronic device, and to recognize the unregistered electronic device based on pre-stored user account information and information of the at least one third external electronic device.

According to an embodiment, the instructions, when executed by the processor, may cause the electronic device to transmit at least part of information indicating that the notification has been provided, or information indicating that the unregistered electronic device is present in the same space as the second external electronic device to the first external electronic device.

According to an embodiment, the instructions, when executed by the processor, may cause the electronic device to receive information about a result of performing at least part of the action corresponding to the user utterance from the second external electronic device, and to transmit information about the result of performing the at least part of the action corresponding to the user utterance to the first external electronic device.

According to an embodiment, a notification related to at least part of the action corresponding to the user utterance may include information indicating that the second external electronic device performs at least part of the action corresponding to the user utterance in response to the user utterance received from the first external electronic device.

According to an embodiment, the instructions, when executed by the processor, may cause the electronic device to generate a natural language message corresponding to the notification, to determine a device, which is capable of visually or audibly outputting the natural language message, from among the second external electronic device and the at least one third external electronic device as an external electronic device that provides the notification, and to transmit a command for outputting the natural language message to the external electronic device that provides the notification.

According to an embodiment, the instructions, when executed by the processor, may cause the electronic device to fail to perform an operation for providing the notification based on determination that the first external electronic device and the second external electronic device are in the same space.

According to an embodiment, the instructions, when executed by the processor, may cause the electronic device to transmit a command for providing a notification different from the notification to the external electronic device based on determination that the first external electronic device and the second external electronic device are in the same space.

Figure 7:
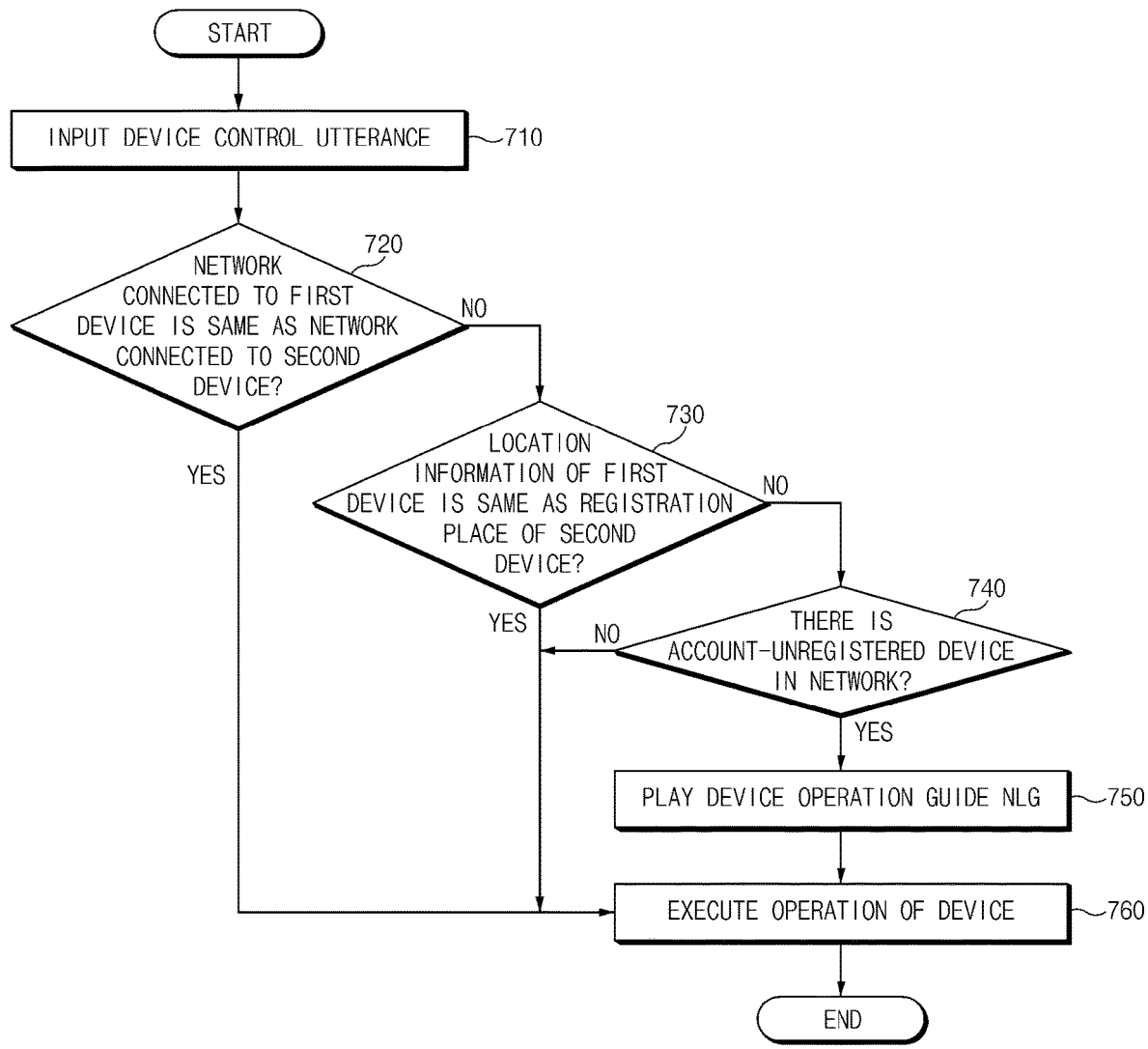
FIG. 7 is a flowchart of a method of providing an operating state of a plurality of devices, according to one or more embodiments.

FIG. 7 is a flowchart of a method of providing an operating state of a plurality of devices, according to one or more embodiments.

According to an embodiment, in operation 710, an electronic device (e.g., the server device 190 in FIG. 1, the electronic device 200 in FIG. 2, the electronic device 305, 405, 505, or 605 in FIGS. 3 to 6, the server 908 in FIG. 9, or the intelligent server 1100 or the service server 1200 in FIG. 10) may receive a device control utterance. For example, the device control utterance may be a user utterance received through a microphone of a first device (e.g., the first device 110 in FIG. 1, the first device 310, 410, 510, or 610 of FIGS. 3 to 6, the electronic device 101 in FIG. 9, or the user terminal 1200 in FIGS. 10 to 12). For example, the electronic device may receive information corresponding to the device control utterance from the first device that has received a user utterance (e.g., the device control utterance). According to an embodiment, the electronic device may determine an execution device (or executor) for performing at least part of an action corresponding to the user utterance. For example, the electronic device may determine a second device as the execution device.

According to an embodiment, in operation 720, the electronic device may determine whether a network connected to the first device is the same as a network connected to the second device. For example, the electronic device may receive network information (e.g., IP address, MAC address, and/or SSID of the connected network) connected to each device from the first device and the second device. For example, the electronic device may determine whether the first device and the second device are located in the same space (or an adjacent location, place, or space) based on whether the first device and second device are connected to the same network. When the first device and the second device are connected to the same network, the electronic device may perform operation 760. When the first device and the second device are not connected to the same network, the electronic device may perform operation 730.

According to an embodiment, in operation 730, the electronic device may determine whether location information of the first device is the same as a registration place of the second device. For example, the electronic device may receive the location information (e.g., GPS information) of the first device from the first device. The electronic device may receive information about a place, at which the second device is registered, from the second device. For example, when the second device is a device registered in the user account, the electronic device may recognize information of the place, at which the second device is registered, based on the user account information. For example, the user account information may include information (e.g., registration place information (e.g., MAC address) of the registered device) of a device registered in the user account. The electronic device may store user account information in advance or may receive the user account information from the second device. For example, the electronic device may determine whether the first device and the second device are located in the same space (or an adjacent location, place, or space), by comparing location information of the first device with registration place information of the second device. When the location information of the first device and the registration place of the second device are the same as each other, the electronic device may perform operation 760. When the location information of the first device and the registration place of the second device are different from each other, the electronic device may perform operation 740.

According to an embodiment, in operation 740, the electronic device may determine whether there is an account-unregistered device in the network to which the second device is connected. For example, the electronic device may receive information about a network connected to the second device and/or information of other devices connected to the network from the second device. For example, when the second device is connected to a router device (e.g., an access point), the electronic device may receive information of other devices connected to the router device from the router device. The electronic device may determine whether there is a device not registered in the user account among devices connected to the network. When the account-unregistered device is present, the electronic device may perform operation 750. When there is no account-unregistered device, the electronic device may perform operation 760.

According to an embodiment, in operation 750, the electronic device may play a device operation guide NLG message through a device placed in the same space as the second device. For example, the electronic device may determine at least one of devices, which are capable of outputting a natural language message, from among devices in the same space as the second device as a device (e.g., notification output device) for providing a notification. The electronic device may generate the device operation guide NLG message and may transmit a command for outputting the device operation guide NLG message to the notification output device.

According to an embodiment, in operation 760, the electronic device may execute an operation of the device. For example, the electronic device may transmit a command for performing an action corresponding to a user utterance (e.g., a device control utterance) to an execution device (e.g., the second device). For example, the second device may perform at least part of an action corresponding to the user utterance.

According to various embodiments, at least part of the operations of FIG. 7 may be omitted, and the order of operations may be changed. For example, in the case where operation 740 is omitted, when the first device and the second device are not in the same space regardless of whether an unregistered device exists or not, in operation 750, the electronic device may play a notification (NLG that guides a device operation) of an operating state (control state) of the device. In another example, operation 720 and operation 730 are omitted, and based on a device control utterance input of a user, the electronic device may immediately perform operation 750. According to various embodiments, the electronic device may provide different notifications based on whether the first device and the second device are in the same space (e.g., whether the first device and second device are connected to the same network, or whether location information of the first device is the same as a registration place of the second device), whether there is an unregistered device around the second device, and/or whether there is an unregistered device in the network to which the second device is connected.

According to an embodiment, the electronic device may allow an execution device to perform at least part of an action corresponding to a user utterance based on the user utterance received from a receiving device related to a voice assistance service, and may provide devices located in the same space (or surroundings) as an execution device with a notification that the user controls the execution device by using the receiving device.

Figure 8:
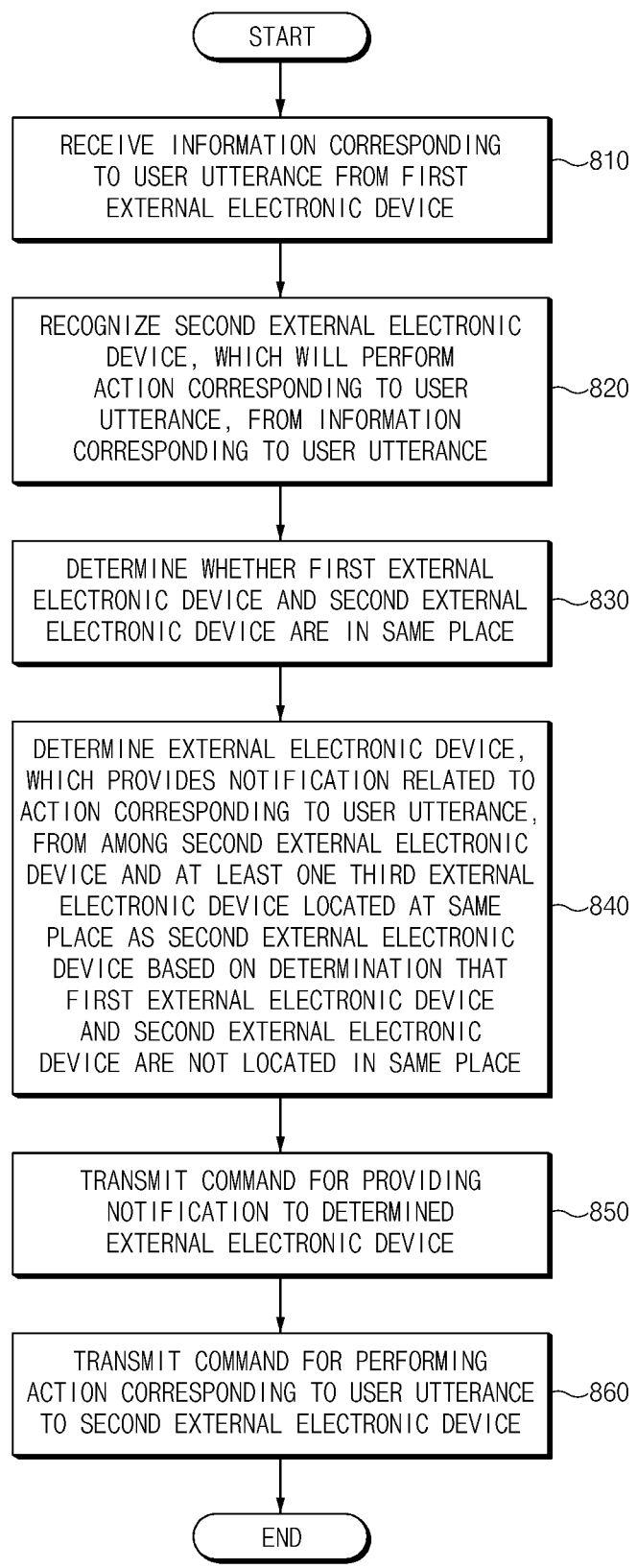
FIG. 8 is a flowchart of a method of providing an operating state of a plurality of devices, according to one or more embodiments.

FIG. 8 is a flowchart of a method of providing an operating state of a plurality of devices, according to one or more embodiments.

According to an embodiment, in operation 810, an electronic device (e.g., the server device 190 in FIG. 1, the electronic device 200 in FIG. 2, the electronic device 305, 405, 505, or 605 in FIGS. 3 to 6, the server 908 in FIG. 9, or the intelligent server in 1100 or the service server 1200 in FIG. 10) may receive information corresponding to a user utterance from a first external electronic device (e.g., the first device 110 in FIG. 1, the first device 310, 410, 510, or 610 of FIGS. 3 to 6, the electronic device 101 in FIG. 9, or the user terminal 1200 in FIGS. 10 to 12). For example, the first external electronic device may be a receiving device that receives a user utterance to provide a voice assistance service. According to an embodiment, the first external electronic device may be located in a different place (e.g., a remote location) from a place of each of a second external electronic device and a third external electronic device.

According to an embodiment, in operation 820, the electronic device may recognize the second external electronic device, which will perform at least part of an action corresponding to the user utterance, from information corresponding to the user utterance. For example, the second external electronic device may be an execution device that performs at least part of an action corresponding to a user utterance to provide a voice assistance service.

According to an embodiment, in operation 830, the electronic device may determine whether the first external electronic device and the second external electronic device are in the same space. For example, the electronic device may receive at least part of location information or network connection information of the first external electronic device from the first external electronic device, and may receive at least part of location information or network connection information of the second external electronic device from the second external electronic device. The electronic device may determine whether the first external electronic device is adjacent to the second external electronic device, based on at least part of the location information or the network information of each of the first external electronic device and the second external electronic device.

According to an embodiment, on the basis of the determination that the first external electronic device and the second external electronic device are not located in the same space, in operation 840, the electronic device may determine an external electronic device, which provides a notification related to at least part of an action corresponding to a user utterance, from among the second external electronic device and at least one third external electronic device located in the same space as the second external electronic device. For example, a notification related to at least part of the action corresponding to the user utterance may include information indicating that the second external electronic device performs at least part of an action corresponding to the user utterance in response to the user utterance received from the first external electronic device. For example, the electronic device may generate a natural language message corresponding to the notification. The electronic device may determine a device, which is capable of visually or audibly outputting a natural language message corresponding to the notification, from among the second external electronic device and the at least one third external electronic device as an external electronic device that provides the notification.

According to an embodiment, the electronic device may determine whether there is an unregistered electronic device, which is not registered in the same user account as the first external electronic device and the second external electronic device, from among the at least one third external electronic device. According to an embodiment, the electronic device may receive information of the at least one third external electronic device, which is connected to an access point device over a network, from the access point device in the same space as the second external electronic device. The electronic device may recognize the unregistered electronic device based on the pre-stored user account information and the information of the at least one third external electronic device. The electronic device may receive the user account information from the first external electronic device or the second external electronic device. The electronic device may determine an external electronic device, which will provide a notification, from among the second external electronic device and the at least one third external electronic device other than the unregistered electronic device.

According to an embodiment, when there is no unregistered electronic device in a space the same as or adjacent to a space in which the second external electronic device is present, the electronic device may not determine an external electronic device for providing a notification and operation 850 may be omitted.

According to an embodiment, the electronic device may not determine an external electronic device for providing the notification and operation 850 may be omitted, based on the fact that the electronic device determines that the first external electronic device and the second external electronic device are in the same space.

According to an embodiment, in operation 850, the electronic device may transmit a command for providing a notification to the determined external electronic device. According to an embodiment, the electronic device may transmit a natural language message corresponding to the notification and/or a command for outputting the natural language message to an external electronic device that provides the notification. According to an embodiment, the electronic device may transmit information indicating that notification has been provided, or at least part of information indicating that the unregistered electronic device is present in the same space as the second external electronic device to the first external electronic device. According to an embodiment, on the basis of the case that the first external electronic device and the second external electronic device are in the same space, the case that the first external electronic device and the second external electronic device are not in the same space, the case that there is an unregistered electronic device in the same space as the second external electronic device, or the case that there is no unregistered electronic device in the same space as the second external electronic device, the electronic device may generate a notification including types, forms, and/or contents different from each other, or may transmit a command that allows the determined external electronic device to provide different notifications.

According to an embodiment, in operation 860, the electronic device may transmit a command for performing at least part of the action corresponding to the user utterance to the second external electronic device. According to an embodiment, the electronic device may receive information about a result of performing at least part of the action corresponding to the user utterance from the second external electronic device. The electronic device may transmit information about a result of performing at least part of the action corresponding to the user utterance to the first external electronic device.

According to various embodiments, at least part of the operations of FIG. 7 may be omitted, and the order of operations may be changed.

According to an embodiment, the electronic device may allow an execution device to perform at least part of an action corresponding to a user utterance based on the user utterance received from a receiving device related to a voice assistance service, and may provide devices located in the same space (or surroundings) as an execution device with a notification that the user controls the execution device by using the receiving device.

According to an embodiment of the disclosure, a method may include receiving information corresponding to a user utterance from a first external electronic device, recognizing a second external electronic device, which will perform at least part of an action corresponding to a user utterance, from the information corresponding to the user utterance, determining whether the first external electronic device and the second external electronic device are in the same space, determining an external electronic device, which provides a notification related to at least part of the action corresponding to the user utterance, among the second external electronic device and at least one third external electronic device placed in the same space as the second external electronic device, based on determination that the first external electronic device and the second external electronic device are not in the same space, transmitting a command for providing the notification to the determined external electronic device, and transmitting a command for performing at least part of the action corresponding to the user utterance to the second external electronic device.

According to an embodiment, the determining of whether the first external electronic device and the second external electronic device are in the same space may include receiving at least part of location information or network connection information of the first external electronic device from the first external electronic device, receiving at least part of location information or network connection information of the second external electronic device from the second external electronic device, and determining whether the first external electronic device is adjacent to the second external electronic device, based on at least part of the location information or the network information of each of the first external electronic device and the second external electronic device.

According to an embodiment, the determining of the external electronic device providing the notification may include determining whether there is an unregistered electronic device, which is not registered in the same user account as the first external electronic device and the second external electronic device, from among the at least one third external electronic device, and determining an external electronic device, which will provide the notification, from among the second external electronic device and the at least one third external electronic device other than the unregistered electronic device.

According to an embodiment, the determining of whether there is the unregistered electronic device may include receiving information of the at least one third external electronic device, which is connected to an access point device over a network, from the access point device placed in the same space as the second external electronic device, and recognizing the unregistered electronic device based on pre-stored user account information and information of the at least one third external electronic device.

According to an embodiment, the method may further include transmitting at least part of information indicating that the notification has been provided, or information indicating that the unregistered electronic device is present in the same space as the second external electronic device to the first external electronic device.

According to an embodiment, the method may further include receiving information about a result of performing at least part of the action corresponding to the user utterance from the second external electronic device, and transmitting information about the result of performing the at least part of the action corresponding to the user utterance to the first external electronic device.

According to an embodiment, a notification related to at least part of the action corresponding to the user utterance may include information indicating that the second external electronic device performs at least part of the action corresponding to the user utterance in response to the user utterance received from the first external electronic device.

According to an embodiment, the transmitting of the command for providing the notification may include generating a natural language message corresponding to the notification, determining a device, which is capable of visually or audibly outputting the natural language message, from among the second external electronic device and the at least one third external electronic device as an external electronic device that provides the notification, and transmitting a command for outputting the natural language message to the external electronic device that provides the notification.

According to an embodiment, the method may further include failing to perform an operation for providing the notification based on determination that the first external electronic device and the second external electronic device are in the same space.

According to an embodiment, the method may further include transmitting a command for providing a notification different from the notification to the external electronic device based on determination that the first external electronic device and the second external electronic device are in the same space.

FIG. 9 is a block diagram illustrating an electronic device in a network environment according to one or more embodiments. Referring to FIG. 9, an electronic device 901 in a network environment 900 may communicate with an electronic device 902 (e.g., an external electronic device) via a first network 998 (e.g., a short-range wireless communication network), or at least one of an electronic device 904 (e.g., an external electronic device) or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thererto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wired) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the electronic device 904 may include an internet-of-things (IoT) device. The server 908 may be an intelligent server using machine learning and/or a neural network. According to an embodiment, the electronic device 904 or the server 908 may be included in the second network 999. The electronic device 901 may be applied to intelligent services (e.g., smart home, smart city, smart car, or healthcare) based on 5G communication technology or IoT-related technology.

FIG. 10 is a block diagram illustrating an integrated intelligence system, according to one or more embodiments.

Referring to FIG. 10, an integrated intelligence system according to an embodiment may include a user terminal 1001, an intelligence server 1100, and a service server 1200.

The user terminal 1001 according to an embodiment may be a terminal device (or an electronic device) capable of connecting to Internet, and may be, for example, a mobile phone, a smartphone, a personal digital assistant (PDA), a notebook computer, a television (TV), a household appliance, a wearable device, a head mounted display (HMD), or a smart speaker.

According to the illustrated embodiment, the user terminal 1001 may include a communication interface 1090, a microphone 1070, a speaker 1055, a display 1060, a memory 1030, or a processor 1020. The listed components may be operatively or electrically connected to one another.

The communication interface 1090 according to an embodiment may be connected to an external device and may be configured to transmit or receive data to or from the external device. The microphone 1070 according to an embodiment may receive a sound (e.g., a user utterance) to convert the sound into an electrical signal. The speaker 1055 according to an embodiment may output the electrical signal as sound (e.g., voice). The display 1060 according to an embodiment may be configured to display an image or a video. The display 1060 according to an embodiment may display the graphic user interface (GUI) of the running app (or an application program).

The memory 1030 according to an embodiment may store a client module 1031, a software development kit (SDK) 1033, and a plurality of apps 1135. The client module 1031 and the SDK 1033 may constitute a framework (or a solution program) for performing general-purposed functions. Furthermore, the client module 1031 or the SDK 1033 may constitute the framework for processing a voice input.

The plurality of apps 1035 may be programs for performing a specified function. According to an embodiment, the plurality of apps 1035 may include a first app 1035a and/or a second app 1035b. According to an embodiment, each of the plurality of apps 1035 may include a plurality of actions for performing a specified function. For example, the apps may include an alarm app, a message app, and/or a schedule app. According to an embodiment, the plurality of apps 1035 may be executed by the processor 1020 to sequentially execute at least part of the plurality of actions.

According to an embodiment, the processor 1020 may control overall operations of the user terminal 1001. For example, the processor 1020 may be electrically connected to the communication interface 1090, the microphone 1070, the speaker 1055, and the display 1060 to perform a specified operation. For example, the processor 1020 may include at least one processor.

Moreover, the processor 1020 according to an embodiment may execute the program stored in the memory 1030 so as to perform a specified function. For example, according to an embodiment, the processor 1020 may execute at least one of the client module 1031 or the SDK 1033 so as to perform a following operation for processing a voice input. The processor 1020 may control operations of the plurality of apps 1035 via the SDK 1033. The following actions described as the actions of the client module 1031 or the SDK 1033 may be the actions performed by the execution of the processor 1020.

According to an embodiment, the client module 1031 may receive a voice input. For example, the client module 1031 may receive a voice signal corresponding to a user utterance detected through the microphone 1070. The client module 1031 may transmit the received voice input (e.g., a voice input) to the intelligence server 1100. The client module 1031 may transmit state information of the user terminal 1001 to the intelligence server 1100 together with the received voice input. For example, the state information may be execution state information of an app.

According to an embodiment, the client module 1031 may receive a result corresponding to the received voice input. For example, when the intelligence server 1100 is capable of calculating the result corresponding to the received voice input, the client module 1031 may receive the result corresponding to the received voice input. The client module 1031 may display the received result on the display 1060.

According to an embodiment, the client module 1031 may receive a plan corresponding to the received voice input. The client module 1031 may display, on the display 1060, a result of executing a plurality of actions of an app depending on the plan. For example, the client module 1031 may sequentially display the result of executing the plurality of actions on a display. For another example, the user terminal 1001 may display only a part of results (e.g., a result of the last action) of executing the plurality of actions, on the display.

According to an embodiment, the client module 1031 may receive a request for obtaining information necessary to calculate the result corresponding to a voice input, from the intelligence server 1100. According to an embodiment, the client module 1031 may transmit the necessary information to the intelligence server 1100 in response to the request.

According to an embodiment, the client module 1031 may transmit, to the intelligence server 1100, information about the result of executing a plurality of actions depending on the plan. The intelligence server 1100 may identify that the received voice input is correctly processed, using the result information.

According to an embodiment, the client module 1031 may include a speech recognition module. According to an embodiment, the client module 1031 may recognize a voice input for performing a limited function, via the speech recognition module. For example, the client module 1031 may launch an intelligence app for processing a specific voice input by performing an organic action, in response to a specified voice input (e.g., wake up!).

According to an embodiment, the intelligence server 1100 may receive information associated with a user's voice input from the user terminal 1001 over a communication network 1099. According to an embodiment, the intelligence server 1100 may convert data associated with the received voice input to text data. According to an embodiment, the intelligence server 1100 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 1100 may transmit a result according to the generated plan to the user terminal 1001 or may transmit the generated plan to the user terminal 1001. According to an embodiment, the user terminal 1001 may display the result according to the plan, on a display. According to an embodiment, the user terminal 1001 may display a result of executing the action according to the plan, on the display.

The intelligence server 1100 according to an embodiment may include a front end 1110, a natural language platform 1120, a capsule database (capsule DB) 1130, an execution engine 1140, an end user interface 1150, a management platform 1160, a big data platform 1170, or an analytic platform 1180.

According to an embodiment, the front end 1110 may receive a voice input received from the user terminal 1001. The front end 1110 may transmit a response corresponding to the voice input to the user terminal 1001.

According to an embodiment, the natural language platform 1120 may include an automatic speech recognition (ASR) module 1121, a natural language understanding (NLU) module 1123, a planner module 1125, a natural language generator (NLG) module 1127, and/or a text to speech module (TTS) module 1129.

According to an embodiment, the ASR module 1121 may convert the voice input received from the user terminal 1001 into text data. According to an embodiment, the NLU module 1123 may grasp the intent of the user, using the text data of the voice input. For example, the NLU module 1123 may grasp the intent of the user by performing syntactic analysis or semantic analysis. According to an embodiment, the NLU module 1123 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 1125 may generate the plan by using a parameter and the intent that is determined by the NLU module 1123. According to an embodiment, the planner module 1125 may determine a plurality of domains necessary to perform a task, based on the determined intent. The planner module 1125 may determine a plurality of actions included in each of the plurality of domains determined based on the intent. According to an embodiment, the planner module 1125 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 1125 may determine the relationship between the plurality of actions and the plurality of concepts stepwise (or hierarchically). For example, the planner module 1125 may determine the execution sequence of the plurality of actions, which are determined based on the user's intent, based on the plurality of concepts. In other words, the planner module 1125 may determine an execution sequence of the plurality of actions, based on the parameters necessary to perform the plurality of actions and the result output by the execution of the plurality of actions. Accordingly, the planner module 1125 may generate a plan including information (e.g., ontology) about the relationship between the plurality of actions and the plurality of concepts. The planner module 1125 may generate the plan, using information stored in the capsule DB 1130 storing a set of relationships between concepts and actions.

According to an embodiment, the NLG module 1127 may change specified information into information in a text form. The information changed to the text form may be in the form of a natural language speech. The TTS module 1129 according to an embodiment may change information in the text form to information in a voice form.

According to an embodiment, all or part of the functions of the natural language platform 1120 may be also implemented in the user terminal 1001.

The capsule DB 1130 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 1130 may store the plurality of capsules in a form of a concept action network (CAN). According to an embodiment, the plurality of capsules may be stored in the function registry included in the capsule DB 1130.

The capsule DB 1130 may include a strategy registry that stores strategy information necessary to determine a plan corresponding to a voice input. When there are a plurality of plans corresponding to the voice input, the strategy information may include reference information for determining one plan. According to an embodiment, the capsule DB 1130 may include a follow-up registry that stores information of the follow-up action for suggesting a follow-up action to the user in a specified context. For example, the follow-up action may include a follow-up utterance. According to an embodiment, the capsule DB 1130 may include a layout registry storing layout information of information output via the user terminal 1001. According to an embodiment, the capsule DB 1130 may include a vocabulary registry storing vocabulary information included in capsule information. According to an embodiment, the capsule DB 1130 may include a dialog registry storing information about dialog (or interaction) with the user. The capsule DB 1130 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 1130 according to an embodiment may be also implemented in the user terminal 1001.

According to an embodiment, the execution engine 1140 may calculate a result by using the generated plan. The end user interface 1150 may transmit the calculated result to the user terminal 1001. Accordingly, the user terminal 1001 may receive the result and may provide the user with the received result. According to an embodiment, the management platform 1160 may manage information used by the intelligence server 1100. According to an embodiment, the big data platform 1170 may collect data of the user. According to an embodiment, the analytic platform 1180 may manage quality of service (QoS) of the intelligence server 1100. For example, the analytic platform 1180 may manage the component and processing speed (or efficiency) of the intelligence server 1100.

According to an embodiment, the service server 1200 may provide the user terminal 1001 with a specified service (e.g., ordering food or booking a hotel). According to an embodiment, the service server 1200 may be a server operated by the third party. According to an embodiment, the service server 1200 may provide the intelligence server 1100 with information for generating a plan corresponding to the received voice input. The provided information may be stored in the capsule DB 1130. Furthermore, the service server 1200 may provide the intelligence server 1100 with result information according to the plan.

In the above-described integrated intelligence system, the user terminal 1001 may provide the user with various intelligent services in response to a user input. The user input may include, for example, an input through a physical button, a touch input, or a voice input.

According to an embodiment, the user terminal 1001 may provide a speech recognition service via an intelligence app (or a speech recognition app) stored therein. In this case, for example, the user terminal 1001 may recognize a user utterance or a voice input, which is received via the microphone, and may provide the user with a service corresponding to the recognized voice input.

According to an embodiment, the user terminal 1001 may perform a specified action, based on the received voice input, independently, or together with the intelligence server 1100 and/or the service server 1200. For example, the user terminal 1001 may launch an app corresponding to the received voice input and may perform the specified action via the executed app.

According to an embodiment, when providing a service together with the intelligence server 1100 and/or the service server 1200, the user terminal 1001 may detect a user utterance by using the microphone 1070 and may generate a signal (or voice data) corresponding to the detected user utterance. The user terminal may transmit the voice data to the intelligence server 1100 by using the communication interface 1090.

According to an embodiment, the intelligence server 1100 may generate a plan for performing a task corresponding to the voice input or the result of performing an action depending on the plan, as a response to the voice input received from the user terminal 1001. For example, the plan may include a plurality of actions for performing the task corresponding to the voice input of the user and/or a plurality of concepts associated with the plurality of actions. The concept may define a parameter to be input upon executing the plurality of actions or a result value output by the execution of the plurality of actions. The plan may include relationship information between the plurality of actions and/or the plurality of concepts.

According to an embodiment, the user terminal 1001 may receive the response by using the communication interface 1090. The user terminal 1001 may output the voice signal generated in the user terminal 1001 to the outside by using the speaker 1055 or may output an image generated in the user terminal 1001 to the outside by using the display 1060.

In FIG. 10, it is described that speech recognition of a voice input received from the user terminal 1001, understanding and generating a natural language, and calculating a result by using a plan are performed on the intelligence server 1100. However, various embodiments of the disclosure are not limited thereto. For example, at least part of configurations (e.g., the natural language platform 1120, the execution engine 1140, and the capsule DB 1130) of the intelligence server 1100 may be embedded in the user terminal 1001 (or the electronic device 101 of FIG. 1), and the operation thereof may be performed by the user terminal 1001.

FIG. 11 is a diagram illustrating a form in which relationship information between a concept and an action is stored in a database, according to one or more embodiments.

A capsule database (e.g., the capsule DB 1130) of the intelligence server 1000 may store a capsule in the form of a CAN. The capsule DB may store an action for processing a task corresponding to a user's voice input and a parameter necessary for the action, in the CAN form.

The capsule DB may store a plurality capsules (e.g., a capsule A 1131 and a capsule B 1134) respectively corresponding to a plurality of domains (e.g., applications). According to an embodiment, a single capsule (e.g., the capsule A 1131) may correspond to a single domain (e.g., a location (geo) or an application). Furthermore, at least one service provider (e.g., CP 1 1132 or CP 10 1133) for performing a function for a domain associated with the capsule may correspond to one capsule. According to an embodiment, the single capsule may include at least one or more actions 1130*a* and at least one or more concepts 1130*b* for performing a specified function.

The natural language platform 1120 may generate a plan for performing a task corresponding to the received voice input, using the capsule stored in a capsule database. For example, the planner module 1025 of the natural language platform may generate the plan by using the capsule stored in the capsule database. For example, a plan 1137 may be generated by using actions 1131*a* and 1132*a* and concepts 1131*b* and 1132*b* of the capsule A 1130*a* and an action 1134*a* and a concept 1134*b* of the capsule B 1134.

FIG. 12 is a view illustrating a user terminal displaying a screen of processing a voice input received through an intelligence app, according to one or more embodiments.

Referring to FIG. 12, a user terminal 1001 may execute an intelligence app to process a user input through the intelligence server 1000.

According to an embodiment, on screen 1010, when recognizing a specified voice input (e.g., wake up!) or receiving an input via a hardware key (e.g., a dedicated hardware key), the user terminal 1001 may launch an intelligence app for processing a voice input. For example, the user terminal 1001 may launch the intelligence app in a state where a schedule app is executed. According to an embodiment, the user terminal 1001 may display an object 1011 (e.g., an icon) corresponding to the intelligence app, on the display 1010. According to an embodiment, the user terminal 1001 may receive a voice input by a user utterance. For example, the user terminal 1001 may receive a voice input saying that "let me know the schedule of this week!". According to an embodiment, the user terminal 1001 may display a user interface (UI) 1013 (e.g., an input window) of the intelligence app, in which text data of the received voice input is displayed, on a display.

According to an embodiment, on screen 1015, the user terminal 1001 may display a result corresponding to the received voice input, on the display. For example, the user terminal 1001 may receive a plan corresponding to the received user input and may display 'the schedule of this week' on the display depending on the plan.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims and their equivalents. Also, it is intended that such modifications are not to be interpreted independently from the technical idea or prospect of the disclosure.

What is claimed is:

1. An electronic device comprising:
   a communication circuit;
   a memory storing instructions; and
   at least one processor including processing circuitry,
   wherein the instructions, when executed by the at least one processor, cause the electronic device to:
   receive, through the communication circuit, information corresponding to a user utterance from a first external electronic device,
   identify a second external electronic device to perform at least a part of an action corresponding to the user utterance, based on the information corresponding to the user utterance,
   determine whether the first external electronic device and the second external electronic device are located within a specified distance of each other,
   based on determining that the first external electronic device and the second external electronic device are not located within the specified distance of each other, identify, from among the second external electronic device and at least one third external electronic device located within the specified distance from the second external electronic device, a target external electronic device to provide a first notification indicating that the second external electronic device is controlled by a user of the first external electronic device,
   based on determining that the first external electronic device and the second external electronic device are located within the specified distance of each other, transmit, through the communication circuit, a command to the target external electronic device to provide the first notification, and
   transmit, through the communication circuit, a command to the second external electronic device to perform the part of the action corresponding to the user utterance.

2. The electronic device of claim 1, wherein the instructions, when executed by the at least one processor, cause the electronic device to:
- receive, through the communication circuit, at least a part of location information or network connection information of the first external electronic device from the first external electronic device;
- receive, through the communication circuit, at least a part of location information or network connection information of the second external electronic device from the second external electronic device; and
- determine whether the first external electronic device and the second external electronic device are located within the specified distance of each other, based on the part of the location information or the network information of each of the first external electronic device and the second external electronic device.

3. The electronic device of claim 1, wherein the instructions, when executed by the at least one processor, cause the electronic device to:
- determine whether the at least one third external electronic device comprises an unregistered electronic device that is not registered in a same user account as the first external electronic device and the second external electronic device; and
- determine the target external electronic device from among the second external electronic device and the at least one third external electronic device other than the unregistered electronic device.

4. The electronic device of claim 3, wherein the instructions, when executed by the at least one processor, cause the electronic device to:
- receive, through the communication circuit, information of the at least one third external electronic device from an access point device connected to the second external electronic device through a network, wherein the at least one third external electronic device is connected to the access point device over a network; and
- identify the unregistered electronic device based on pre-stored user account information and the information of the at least one third external electronic device.

5. The electronic device of claim 3, wherein the instructions, when executed by the at least one processor, cause the electronic device to:
- transmit, through the communication circuit, at least a part of information indicating that the first notification has been provided, or information indicating that the unregistered electronic device is in the same space as the second external electronic device to the first external electronic device.

6. The electronic device of claim 1, wherein the instructions, when executed by the at least one processor, cause the electronic device to:
- receive, through the communication circuit, information about a result of performing the part of the action corresponding to the user utterance from the second external electronic device; and
- transmit, through the communication circuit, the information about the result of performing the part of the action corresponding to the user utterance to the first external electronic device.

7. The electronic device of claim 1, wherein the first notification comprises information indicating that the second external electronic device is determined to perform the part of the action corresponding to the user utterance based on the user utterance received from the first external electronic device.

8. The electronic device of claim 1, wherein the instructions, when executed by the at least one processor, cause the electronic device to:
- generate a natural language message corresponding to the first notification;
- determine the target external electronic device to provide the first notification such that the target external electronic device is capable of visually or audibly outputting the natural language message; and
- transmit, through the communication circuit, a command to the target external electronic device to output the natural language message.

9. The electronic device of claim 1, wherein the instructions, when executed by the at least one processor, cause the electronic device to:
- based on determining that the first external electronic device and the second external electronic device are located within the specified distance of each other, determine to not provide the first notification using the target external electronic device.

10. The electronic device of claim 1, wherein the instructions, when executed by the at least one processor, cause the electronic device to:
- based on determining that the first external electronic device and the second external electronic device are located within the specified distance of each other, determine the target external electronic device and transmit a command to the target external electronic device to provide a second notification different from the first notification.

11. A method for providing operating states of a plurality of devices, the method comprising:
- receiving information corresponding to a user utterance from a first external electronic device;
- identifying a second external electronic device to perform at least a part of an action corresponding to the user utterance, based on the information corresponding to the user utterance;
- determining whether the first external electronic device and the second external electronic device are located within a specified distance of each other;
- based on determining that the first external electronic device and the second external electronic device are not located within the specified distance of each other, determining a target external electronic device, from among the second external electronic device and at least one third external electronic device located within the specified distance from the second external electronic device, to provide a first notification indicating that the second external electronic device is controlled by a user of the first external electronic device;
- based on determining that the first external electronic device and the second external electronic device are not located within the specified distance of each other, transmitting a command to the target external electronic device to provide the first notification; and
- transmitting a command to the second external electronic device to perform the part of the action corresponding to the user utterance.

12. The method of claim 11, wherein the determining whether the first external electronic device and the second external electronic device are in the same space comprises:
- receiving, from the first external electronic device, at least a part of location information or network connection information of the first external electronic device;

receiving, from the second external electronic device, at least part of location information or network connection information of the second external electronic device; and determining whether the first external electronic device and the second external electronic device are located within the specified distance of each other, based on the part of the location information or the network information of each of the first external electronic device and the second external electronic device.

13. The method of claim 11, wherein the determining the target external electronic device to provide the first notification comprises:

determining whether the at least one third external electronic device comprises an unregistered electronic device that is not registered in a same user account as the first external electronic device and the second external electronic device; and determining the target external electronic device from among the second external electronic device and the at least one third external electronic device other than the unregistered electronic device.

14. The method of claim 13, wherein the determining whether the at least one third external electronic device comprises an unregistered electronic device comprises:

receiving information of the at least one third external electronic device from an access point device connected to the second external electronic device through a network, wherein the at least one third external electronic device is connected to the access point device over a network; and identifying the unregistered electronic device based on pre-stored user account information and the information of the at least one third external electronic device.

15. The method of claim 13, further comprising:

transmitting, to the first external electronic device, at least a part of information indicating that the first notification has been provided or information indicating that the unregistered electronic device is present in the same space as the second external electronic device.

16. The method of claim 11, further comprising:

receiving, from the second external electronic device, information about a result of performing the part of the action corresponding to the user utterance; and transmitting, to the first external electronic device, information about the result of performing the part of the action corresponding to the user utterance.

17. The method of claim 11, wherein the first notification comprises information indicating that the second external electronic device is determined to perform the part of the action corresponding to the user utterance based on the user utterance received from the first external electronic device.

18. The method of claim 11, wherein the transmitting the command to the target external electronic device to provide the first notification comprises:

generating a natural language message corresponding to the first notification;

determining the target external electronic device to provide the first notification such that the target external electronic device is capable of visually or audibly outputting the natural language message; and transmitting a command to the target external electronic device to output the natural language message.

19. The method of claim 11, further comprising:

based on determining that the first external electronic device and the second external electronic device are located within the specified distance of each other, determining to not provide the first notification using the target external electronic device.

20. The method of claim 11, further comprising:

based on determining that the first external electronic device and the second external electronic device are located within the specified distance of each other, determining the target external electronic device and transmitting a command to the target external electronic device to provide a second notification different from the first notification.

* * * * *